United States Patent
Kuzuhara et al.

(10) Patent No.: US 12,442,957 B2
(45) Date of Patent: Oct. 14, 2025

(54) ANTIGLARE FILM, AND POLARIZING PLATE, SURFACE PLATE, AND IMAGE DISPLAY DEVICE THAT USE SAME

(71) Applicant: DAI NIPPON PRINTING CO., LTD., Tokyo (JP)

(72) Inventors: Mitsuhiro Kuzuhara, Tsukuba (JP); Junya Eguchi, Okayama (JP); Gen Furui, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1074 days.

(21) Appl. No.: 17/421,204

(22) PCT Filed: Jan. 10, 2020

(86) PCT No.: PCT/JP2020/000555
§ 371 (c)(1),
(2) Date: Dec. 16, 2021

(87) PCT Pub. No.: WO2020/145370
PCT Pub. Date: Jul. 16, 2020

(65) Prior Publication Data
US 2022/0373720 A1  Nov. 24, 2022

(30) Foreign Application Priority Data
Jan. 10, 2019 (JP) .................. 2019-002903

(51) Int. Cl.
*G02B 1/11* (2015.01)
*G02B 5/02* (2006.01)
(Continued)

(52) U.S. Cl.
CPC .............. *G02B 1/11* (2013.01); *G02B 5/0221* (2013.01); *G02B 5/0294* (2013.01); *H10K 50/86* (2023.02);
(Continued)

(58) Field of Classification Search
None
See application file for complete search history.

(56) References Cited

U.S. PATENT DOCUMENTS

2009/0061165 A1\* 3/2009 Iwata ................ G02B 5/0294
428/179
2010/0195311 A1\* 8/2010 Furui .................. G02B 5/0221
427/164

FOREIGN PATENT DOCUMENTS

JP  2007-322779  12/2007
JP  2010-113219  5/2010
(Continued)

OTHER PUBLICATIONS

International Search Report of PCT/JP2020/000555, Mar. 17, 2020, 7 pages including English translation.
(Continued)

*Primary Examiner* — Derek S. Chapel
(74) *Attorney, Agent, or Firm* — HSML P.C.

(57) ABSTRACT

Provided is an anti-glare film that can suppress reflection and impart a sense of luxury by suppressing surface graininess. The anti-glare film includes a first main surface and a second main surface opposite to the first main surface, in which when the average inclination angle with a cut-off value of 0.8 mm of the first main surface is defined as $\theta a_{0.8}$ and the average inclination angle with a cut-off value of 2.5 mm of the first main surface is defined as $\theta a_{2.5}$, the anti-glare film satisfies the following Equations (1) and (2).

$$0.20 \text{ degrees} \leq \theta a_{0.8} \leq 0.70 \text{ degrees} \quad (1)$$

$$|\theta a_{2.5} - \theta a_{0.8}| \leq 0.10 \text{ degrees} \quad (2)$$

10 Claims, 4 Drawing Sheets

(51) Int. Cl.
*H10K 50/86* (2023.01)
*H10K 59/80* (2023.01)
*G02F 1/1335* (2006.01)

(52) U.S. Cl.
CPC ... *H10K 59/8791* (2023.02); *G02F 1/133502* (2013.01)

(56) References Cited

FOREIGN PATENT DOCUMENTS

| JP | 2010256850 A | 11/2010 |
| JP | 2011-197545 | 10/2011 |
| JP | 2011-232547 | 11/2011 |
| JP | 2013-142817 | 7/2013 |
| JP | 2013-195606 | 9/2013 |
| JP | 2015-072412 | 4/2015 |
| JP | 2015-232614 | 12/2015 |
| JP | 2016-035574 | 3/2016 |
| JP | 2016-161834 | 9/2016 |
| JP | 2016-177186 | 10/2016 |
| JP | 2017-047594 | 3/2017 |
| JP | 2019-020728 | 2/2019 |
| WO | 2008/020578 | 2/2008 |
| WO | WO-2008020578 A1 * | 2/2008 | ............... G02B 5/02 |
| WO | 2013/099931 | 7/2013 |
| WO | 2017/061493 | 4/2017 |
| WO | WO-2017061493 A1 * | 4/2017 | ............... B32B 3/26 |

OTHER PUBLICATIONS

Request for the Submission of an Opinion issued for Korean Patent Application No. 10-2021-7024815, dated Aug. 20, 2024, 10 pages including English machine translation.

* cited by examiner

[Fig. 1]
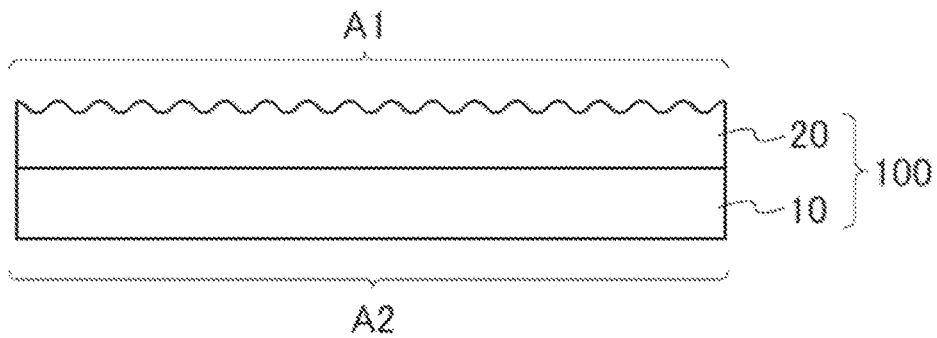
[Fig. 2]
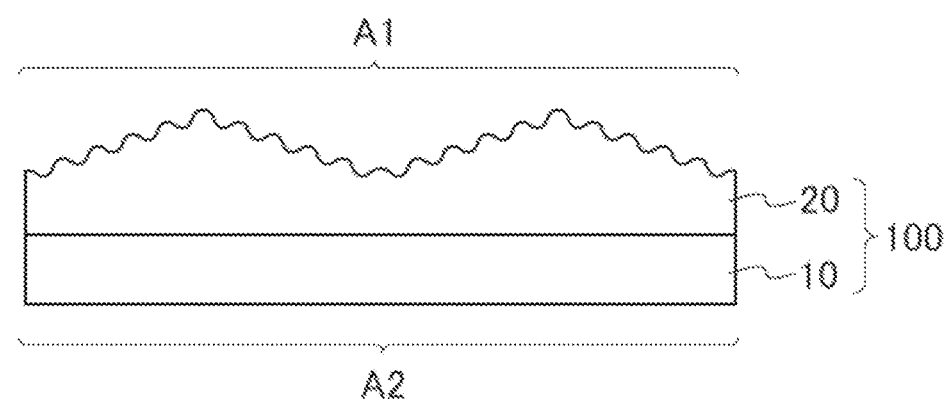
[Fig. 3]
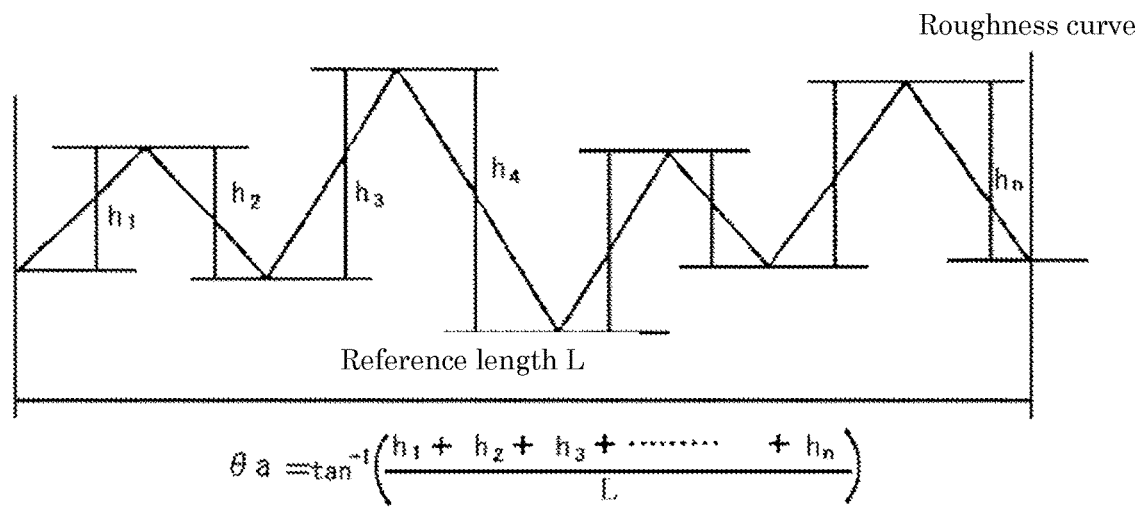

[Fig. 4]
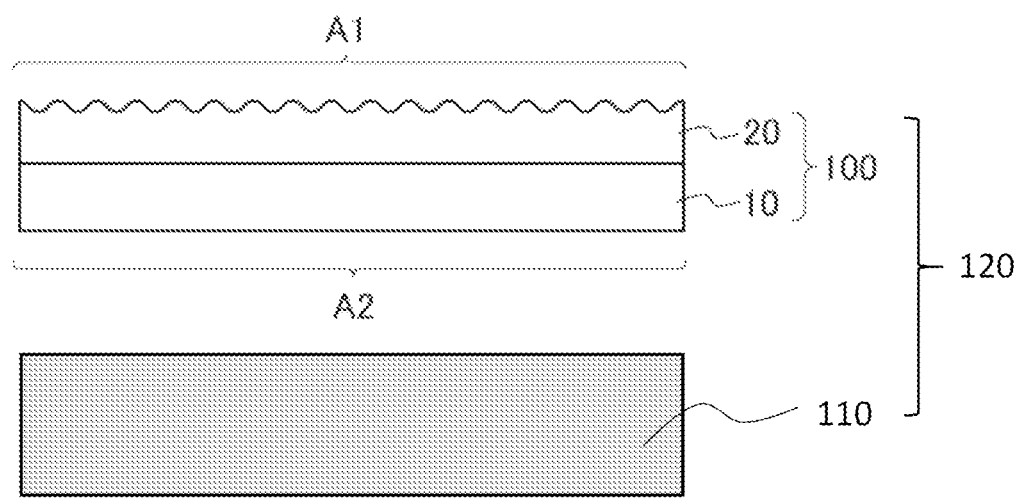

[Fig. 5 (A)]
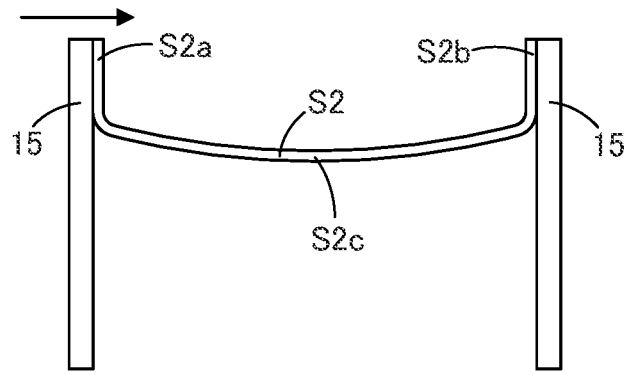
[Fig. 5 (B)]
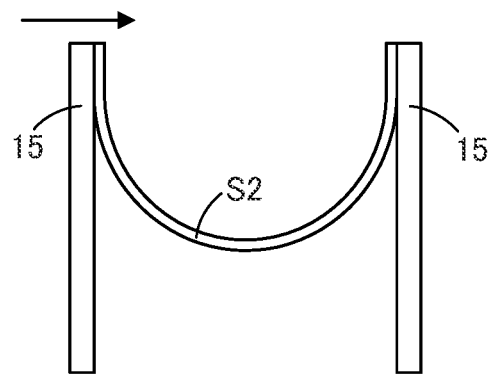
[Fig. 5 (C)]
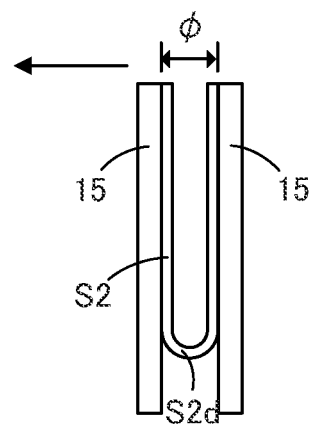

[Fig. 6]
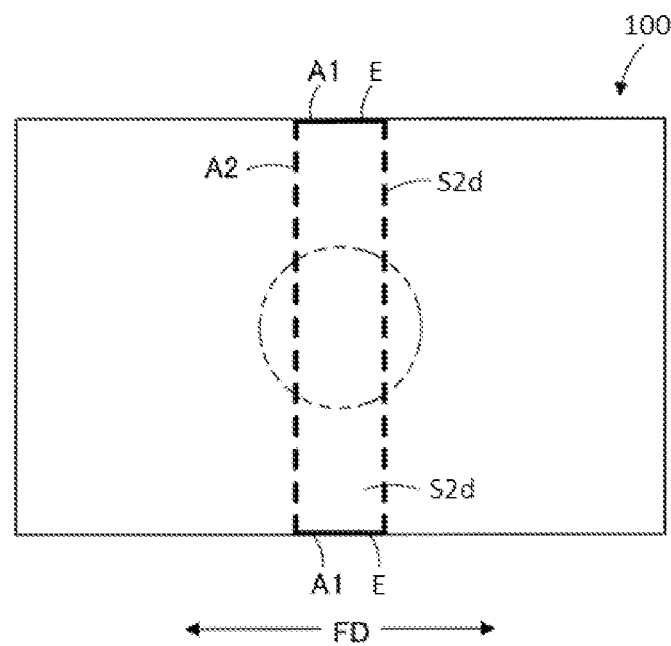

ANTIGLARE FILM, AND POLARIZING PLATE, SURFACE PLATE, AND IMAGE DISPLAY DEVICE THAT USE SAME

TECHNICAL FIELD

The present invention relates to an anti-glare film, and a polarization plate, a surface plate, and an image display device using the anti-glare film.

BACKGROUND ART

An anti-reflection film for suppressing the reflection of external light or an anti-glare film for suppressing a background from being reflected may be installed on the surface of an image display device such as a monitor of a TV, a laptop PC, or a desktop PC.

An anti-reflection film is basically composed of a multilayer thin film on a transparent substrate, and for example, Patent Literature 1 to 3 and the like has been proposed.

An anti-glare film is basically composed of an anti-glare layer having an unevenly shaped surface on a transparent substrate, and for example, Patent Literature 4 to 6 and the like has been proposed.

CITATION LIST

Patent Literature

PTL 1: Japanese Patent Application Laid-Open No. 2013-142817
PTL 2: Japanese Patent Application Laid-Open No. 2015-232614
PTL 3: Japanese Patent Application Laid-Open No. 2016-177186
PTL 4: Japanese Patent Application Laid-Open No. 2010-113219
PTL 5: Japanese Patent Application Laid-Open No. 2011-232547
PTL 6: Japanese Patent Application Laid-Open No. 2016-35574

SUMMARY OF INVENTION

Technical Problem

In recent years, the size of indoor televisions has been increasing. Since large-sized televisions occupy a large volume indoors, it is preferable that the television is in harmony with the surrounding interior, and further, it is preferable that the television can impart a sense of luxury.

Although anti-reflection films such as those in Patent Literature 1 to 3 can reduce the reflectance of external light, people and the background are reflected on the surface of the anti-reflection film when the power of the image display device is turned off, and as a result the harmony with the surrounding interior is not sufficient.

On the other hand, among anti-glare films such as those in Patent Literature 4 to 6, the type having strong anti-glare properties can sufficiently suppress the reflection of the background and the like when the power of the image display device is turned off, but the surface feels grainy and a sense of luxury is lacking. In addition, among anti-glare films, the type having weak anti-glare properties does not sufficiently suppress reflection of the background and the like when the power of the image display device is turned off, and further, although not as bad as the type having strong anti-glare properties, the surface can sometimes feel grainy.

It is an object of the present invention to provide an anti-glare film that can suppress reflection and impart a sense of luxury by suppressing surface graininess, and a polarization plate, a surface plate, and an image display device using the anti-glare film.

Solution to Problem

The present invention provides the following [1] to [4], which are an anti-glare film and a polarization plate, surface plate, and image display device using the anti-glare film.

[1] An anti-glare film comprising:
  a first main surface; and
  a second main surface opposite to the first main surface,
  in which when the average inclination angle with a cut-off value of 0.8 mm of the first main surface is defined as $\theta a_{0.8}$ and the average inclination angle with a cut-off value of 2.5 mm of the first main surface is defined as $\theta a_{2.5}$, the anti-glare film satisfies the following Equations (1) and (2).

$$0.20 \text{ degrees} \leq \theta a_{0.8} \leq 0.70 \text{ degrees} \tag{1}$$

$$|\theta a_{2.5} - \theta a_{0.8}| \leq 0.10 \text{ degrees} \tag{2}$$

[2] A polarization plate comprising:
  a polarizer;
  a transparent protection plate A arranged on one side of the polarizer; and
  a transparent protection plate B arranged on the other side of the polarizer,
  in which at least one selected from the group consisting of the transparent protection plate A and the transparent protection plate B is the anti-glare film according to the above [1], and the anti-glare film is arranged so that the surface on the first main surface side faces the side opposite to the polarizer.

[3] A surface plate for an image display device, comprising an anti-glare film attached to a resin plate or a glass plate, in which the anti-glare film is the anti-glare film according to the above [1], and the anti-glare film is arranged so that the surface on the first main surface side faces the side opposite to the resin plate or the glass plate.

[4] An image display device comprising the anti-glare film according to the above [1] arranged on a display element such that the surface on the first main surface side of the anti-glare film faces the side opposite to the display element, and the anti-glare film is arranged on the outermost surface.

In the present invention, "anti-glare properties" means anti-glare properties to the extent that reflection is not a concern, and does not mean a high-degree of anti-glare properties that completely prevents reflection.

Advantageous Effects of Invention

The anti-glare film of the present invention and the polarization plate, surface plate, and image display device using the anti-glare film, can suppress reflection and impart a sense of luxury by suppressing surface graininess.

BRIEF DESCRIPTION OF DRAWINGS

FIG. 1 is a conceptual diagram of a cross-sectional shape of an anti-glare film (anti-glare film of Example 1) of the present invention.

FIG. 2 is a conceptual diagram of a cross-sectional shape of an anti-glare film of Comparative Example 1.

FIG. 3 is a diagram illustrating a method of calculating an average inclination angle θa.

FIG. 4 is a cross-sectional view illustrating an embodiment of an image display device of the present invention.

FIG. 5 (A)-(C) are diagrams schematically illustrating a consecutive folding test.

FIG. 6 is a reference diagram for illustrating an assessment method of a bent portion after the consecutive folding test.

DESCRIPTION OF EMBODIMENTS

Hereinafter, embodiments of the present invention will be described.

[Anti-Glare Film]

The anti-glare film according to the present invention comprises a first main surface and a second main surface opposite to the first main surface, wherein when the average inclination angle with a cut-off value of 0.8 mm of the first main surface is defined as $\theta a_{0.8}$ and the average inclination angle with a cut-off value of 2.5 mm of the first main surface is defined as $\theta a_{2.5}$, the anti-glare film satisfies the following Equations (1) and (2).

$$0.20 \text{ degrees} \leq \theta a_{0.8} \leq 0.70 \text{ degrees} \quad (1)$$

$$|\theta a_{2.5} - \theta a_{0.8}| \leq 0.10 \text{ degrees} \quad (2)$$

FIG. 1 is a conceptual diagram of a cross-sectional shape of an anti-glare film 100 of the present invention.

The anti-glare film 100 of FIG. 1 has a first main surface A1 and a second main surface A2 opposite to the first main surface. Further, the anti-glare film 100 of FIG. 1 has a resin layer 20 on a transparent substrate 10, and the surface of the resin layer 20 serves as the first main surface A1.

The anti-glare film is not limited to the laminated structure of FIG. 1 as long as it has a first main surface satisfying Equations (1) and (2). The anti-glare film may have a single-layer structure of a resin layer, or have a layer other than the transparent substrate and the resin layer (for example, a low refractive index layer, and the like). A preferred embodiment of the anti-glare film is an anti-glare film that comprises a resin layer on a transparent substrate, in which the surface of the resin layer serves as the first main surface.

The following (X1) to (X9) are examples of the layer structure of the anti-glare film. In (X1) to (X9), "/" indicates a layer interface. Further, in (X2) to (X9), the surface of the layer located on the rightmost side is the first main surface.
  (X1) single layer of resin layer
  (X2) transparent substrate/resin layer
  (X3) transparent substrate/resin layer/low refractive index layer
  (X4) transparent substrate/resin layer/anti-fouling layer
  (X5) transparent substrate/resin layer/antistatic layer
  (X6) transparent substrate/primer layer/resin layer
  (X7) transparent substrate/primer layer/resin layer/low refractive index layer
  (X8) transparent substrate/primer layer/resin layer/anti-fouling layer
  (X9) transparent substrate/primer layer/resin layer/antistatic layer The antistatic layer may also serve as a high refractive index layer, and a low refractive index layer, an anti-fouling layer, or the like may be laminated on the antistatic layer.

<First Main Surface>

In the anti-glare film of the present invention, the first main surface satisfies the above Equations (1) and (2).

<<Equation (1)>>

Equation (1) stipulates that the average inclination angle ($\theta a_{0.8}$) with a cut-off value of 0.8 mm is 0.20 degrees or higher and 0.70 degrees or lower.

If $\theta a_{0.8}$ is lower than 0.20 degrees, people and the background will be reflected on the surface of the anti-glare film, and thus the member (television and the like) to which the anti-glare film is attached will not be in sufficient harmony with the surrounding interior. Further, when $\theta a_{0.8}$ exceeds 0.70 degrees, the graininess of the surface of the anti-glare film cannot be suppressed, and thus the member to which the anti-glare film is attached cannot be imparted with a sense of luxury. Further, when $\theta a_{0.8}$ exceeds 0.70 degrees, the anti-glare film may appear whitish.

$\theta a_{0.8}$ is preferably 0.25 degrees or higher and 0.60 degrees or lower, and more preferably 0.30 degrees or higher and 0.50 degrees or lower.

Note that the "graininess" is a phenomenon that is felt due to reflected light such as illumination light being reflected by the surface of the anti-glare film. On the other hand, "scintillation", which will be described later, is a phenomenon that is felt due to transmitted light such as image light and illumination light being transmitted through the anti-glare film. In this way, "graininess" and "scintillation" mean completely different phenomena. Additionally, "graininess" is a phenomenon that can be observed when the light source such as illumination light, which is the source of the reflected light, is on the first main surface side of the anti-glare film, regardless of whether or not the anti-glare film has transparency and regardless of the type of member on the second main surface side of the anti-glare film. Further, "graininess" is observed even if there is no light source on the second main surface side of the anti-glare film. On the other hand, "scintillation" is a phenomenon observed when the anti-glare film has transparency and there is a light source such as a display element on the second main surface side of the anti-glare film. Further, "scintillation" is observed even if there is no light source on the first main surface side of the anti-glare film.

<<Equation (2)>>

Equation (2) stipulates that the absolute value of the difference between the average inclination angle ($\theta a_{2.5}$) with a cut-off value of 2.5 mm and the average inclination angle ($\theta a_{0.8}$) with a cut-off value of 0.8 mm is 0.10 degrees or lower.

The meaning of Equation (2) and the technical significance of satisfying Equations (1) and (2) will be explained below.

The cut-off value is an index showing the degree to which long-cycle unevenness is excluded from a roughness curve. Therefore, the average inclination angle ($\theta a_{2.5}$) with a cut-off value of 2.5 mm means an average inclination angle including long-cycle unevenness (ultralow-frequency unevenness), and the average inclination angle ($\theta a_{0.8}$) with a cut-off value of 0.8 mm means an average inclination angle that does not include long-cycle unevenness (ultralow-frequency unevenness), and includes only short-cycle unevenness.

In addition, the average inclination angle of short-cycle unevenness is usually higher than that of ultralow-frequency unevenness. That is, usually, $\theta a_{0.8}$ is larger than $\theta a_{2.5}$. However, in the case of a shape having a small ratio of ultralow-frequency unevenness, the degree by which $\theta a_{0.8}$ is larger than $\theta a_{2.5}$ is lower.

Therefore, in Equation (2), when the absolute value of the difference between $\theta a_{2.5}$ and $\theta a_{0.8}$ is 0.10 degrees or lower, this means that $\theta a_{0.8}$ is not too much larger than $\theta a_{2.5}$. In other words, this means that there is little ultralow-frequency unevenness on the first main surface.

As shown in Equation (1), the first main surface of the anti-glare film of the present invention has an average inclination angle with a cut-off value of 0.8 mm (average inclination angle based on short-cycle unevenness) of a predetermined value, and therefore has at least short-cycle unevenness. Thus, the first main surface of the anti-glare film of the present invention satisfying Equations (1) and (2) has short-cycle unevenness, but has a low ratio of ultralow-frequency unevenness. Further, the anti-glare film of the present invention having such a first main surface has a very fine appearance, suppresses graininess, and can be imparted with a sense of luxury. In addition, the anti-glare film of the present invention satisfying Equations (1) and (2) can be applied to an image display device in which a bezel (frame) has a smooth surface, so that the appearance of the bezel and inside of the bezel is similar when the power is turned off, thereby allowing the image display device to have an enhanced feeling of integration. It should be noted that ultralow-frequency unevenness tends to cause scintillation (a phenomenon in which subtle luminance unevenness can be seen in transmitted light such as image light transmitted through the anti-glare film) due to the action of a lens. Therefore, satisfying Equations (1) and (2) and reducing the ratio of ultralow-frequency unevenness is preferable in that it also leads to suppression of scintillation.

FIG. 1 is a conceptual diagram of a cross-sectional shape of the anti-glare film (anti-glare film of Example 1) of the present invention. The first main surface A1 of the anti-glare film 100 of FIG. 1 is formed only from short-cycle unevenness.

On the other hand, an anti-glare film that does not satisfy Equation (2) has an appearance in which ultralow-frequency unevenness and short-cycle unevenness are superimposed, so that graininess cannot be suppressed, and as a result, a sense of luxury cannot be imparted. FIG. 2 is a conceptual diagram of a cross-sectional shape of an anti-glare film of Comparative Example 1. The first main surface A1 of the anti-glare film 100 of FIG. 2 is formed from unevenness in which short-cycle unevenness is superimposed on ultralow-frequency unevenness.

In this specification, a cut-off value ($\lambda c$) is set to 0.8 mm and 2.5 mm in the measurement of surface roughness. The reason for this is to define a surface shape at a cut-off value that sufficiently exceeds the resolution limit of 0.12 mm for the human eye and is not too long.

In Equation (2), the absolute value of the difference between $\theta a_{2.5}$ and $\theta a_{0.8}$ is preferably 0.09 degrees or lower, more preferably 0.08 degrees or less, and further preferably 0.07 degrees or lower.

An average inclination angle $\theta a$ is, for example, a value defined in the instruction manual (revised 1995 Jul. 20) of a surface roughness measuring instrument (trade name: SE-3400) manufactured by Kosaka Laboratory Ltd. As shown in FIG. 3, the average inclination angle $\theta a$ can be determined by calculating the arctangent $\theta a = \tan^{-1}\{(h_1+h_2+h_3+\ldots+h_n)/L\}$ of a value obtained by dividing the sum of the heights of the convex portions $(h_1+h_2+h_3+\ldots+h_n)$ present in a reference length L by L. In this specification, the reference length is divided into 1500 sections, the height data of the 1500 sections is obtained, and the average inclination angle $\theta a$ is calculated based on the height data of those 1500 sections. The reference length (L) is equal to the cut-off value ($\lambda c$).

$\theta a$ can also be measured using an instrument model conforming to the measurement standard of JIS B0601: 1994, for example, instruments having trade names SE600, SE600K31, SE700, or SE4000 manufactured by Kosaka Laboratory Ltd. Other surface shape parameters (S, Ra, Rz) described in this specification can be measured in the same manner as long as the instrument model conforms to the measurement standard of JIS B0601: 1994.

In this specification, the average inclination angle and the numerical values relating to the other surface shapes, as well as the optical properties (specular glossiness, total light transmittance, haze), are the average values of measured values from fourteen locations from which the minimum and maximum values of measured values from sixteen locations have been excluded.

In this specification, for sixteen measurement points, it is preferable that each of the sixteen intersections obtained when a region of 1 cm from the outer edge of the measurement sample is defined as a margin and lines are drawn to divide the area inside the margin into five equal parts in the vertical and horizontal directions is set as a center of measurement. For example, when the measurement sample is a quadrangle, it is preferable that the measurement is performed so that each of the sixteen intersections obtained when a region of 1 cm from the outer edge of the quadrangle is defined as a margin and lines are drawn to divide the area inside the margin into five equal parts in the vertical and horizontal directions is set as a center of measurement, and the parameter is calculated in terms of the average value thereof. When the measurement sample has a shape other than a quadrangle such as a circle, an ellipse, a triangle, or a pentagon, it is preferable to draw a quadrangle inscribed inside these shapes and measurement is performed at each of the sixteen locations of the quadrangle according to the above method.

<<Equation (3)>>

The anti-glare film of the present invention preferably satisfies, when the average local peak-to-peak interval at a cut-off value of 0.8 mm of JIS B0601: 1994 on the first main surface is defined as $S_{0.8}$ and the average local peak-to-peak interval at a cut-off value of 2.5 mm of JIS B0601: 1994 on the first main surface is defined as $S_{2.5}$, the following Equation (3).

$$S_{2.5}/S_{0.8} \leq 1.40 \tag{3}$$

In JIS B0601: 1994, the average local peak-to-peak interval S is defined as "representing the average of the local peak-to-peak intervals each of which is obtained by extracting a reference length from the roughness curve in the direction of the average line and calculating the length of the average line between adjacent local peaks".

A general roughness curve is a combination of convex portions and concave portions having various cycles. That is, in general, the average local peak-to-peak interval S is calculated from a roughness curve composed of a combination of convex portions and concave portions having various cycles.

Further, the cut-off value is an index showing the degree of exclusion of long-cycle unevenness from the roughness curve. The smaller the cut-off value, the greater the degree of exclusion of long-cycle unevenness. Therefore, while the average local peak-to-peak interval $S_{0.8}$ with a cut-off value of 0.8 mm is a numerical value excluding ultralow-frequency unevenness, the average local peak-to-peak interval $S_{2.5}$ with a cut-off value of 2.5 mm can be said to be a numerical value including ultralow-frequency unevenness. That is, as $S_{0.8}$ and $S_{2.5}$, the average local peak-to-peak intervals S are calculated based on roughness curves with different degrees of mixing of the cycle of the unevenness.

When the degree of mixing of the cycle of the unevenness in the roughness curve is large, short-cycle unevenness may be canceled out by long-cycle unevenness. For example, when the location where the height of long-cycle unevenness continues to increase overlaps short-cycle unevenness, the component decreasing in the height of the short-cycle unevenness may be canceled out by the component increasing in the height of the long-cycle unevenness. In this case, a part of the short-cycle unevenness is not counted in the average local peak-to-peak interval S. Therefore, the greater the degree of mixing of the cycle of unevenness in the roughness curve, the greater the rate of change in the average local peak-to-peak interval S due to the difference in cut-off values. In the cases of $S_{2.5}$ and $S_{0.8}$, the larger the ratio of ultralow-frequency unevenness influencing $S_{2.5}$, the larger $S_{2.5}$ is with respect to $S_{0.8}$.

Therefore, when $S_{2.5}/S_{0.8}$ is 1.40 or less (the above Equation (3) is satisfied), this means that the ratio of ultralow-frequency unevenness influencing $S_{2.5}$ is small. Therefore, by satisfying Equation (3), the anti-glare film can easily have a fine appearance without graininess, and a sense of luxury can be imparted. Further, by satisfying Equation (3), scintillation can be easily suppressed.

In Equation (3), $S_{2.5}/S_{0.8}$ is preferably 1.35 or less, more preferably 1.30 or less, and further preferably 1.25 or less.

The lower limit of $S_{2.5}/S_{0.8}$ is not particularly limited, but is preferably 1.05 or more, and more preferably 1.10 or more.

The anti-glare film of the present invention has an $S_{0.8}$ of the first main surface of preferably 100 μm or less, more preferably 80 μm or less, and further preferably 75 μm or less. The resolution limit of the human eye is 0.12 mm (120 μm). Therefore, by setting $S_{0.8}$ to 100 μm or less, the anti-glare film can easily have a fine appearance without graininess.

The lower limit of $S_{0.8}$ is not particularly limited, but is preferably 20 μm or more, and more preferably 30 μm or more.

<<Equation 4>>

The anti-glare film of the present invention preferably satisfies, when the arithmetic average roughness at a cut-off value of 0.8 mm of JIS B0601: 1994 on the first main surface is defined as $Ra_{0.8}$ and the arithmetic average roughness at a cut-off value of 2.5 mm of JIS B0601: 1994 on the first main surface is defined as $Ra_{2.5}$, the following Equation (4).

$$Ra_{2.5}/Ra_{0.8} \leq 1.20 \quad (4)$$

The fact that $Ra_{2.5}/Ra_{0.8}$ is 1.20 or less (the above Equation (4) is satisfied) means that the ratio of ultralow-frequency unevenness is small. Therefore, by satisfying Equation (4), the anti-glare film can easily have a fine appearance without graininess, and a sense of luxury can be imparted. Further, by satisfying Equation (4), scintillation can be easily suppressed.

The anti-glare film of the present invention has an $Ra_{0.8}$ of the first main surface of preferably 0.03 to 0.20 μm, more preferably 0.04 to 0.15 μm, and further preferably 0.05 to 0.10 μm.

By setting $Ra_{0.8}$ to 0.03 μm or more, it is possible to prevent people and the background from being reflected on the surface of the anti-glare film, and to improve the harmony between the member (television and the like) to which the anti-glare film is attached and the surrounding interior. Further, by setting $Ra_{0.8}$ to 0.20 μm or less, it is possible to easily suppress the anti-glare film from appearing whitish.

<<$Rz_{0.8}$ and $Rz_{0.8}/Ra_{0.8}$>>

When a ten-point average roughness at a cut-off value of 0.8 mm of JIS B0601: 1994 of the first main surface is defined as $Rz_{0.8}$, the anti-glare film of the present invention has ratio between the $Ra_{0.8}$ and the $Rz_{0.8}$ ($Rz_{0.8}/Ra_{0.8}$) of preferably 2.00 to 5.50, more preferably 3.00 to 5.25, and further preferably 3.50 to 5.00.

By setting $Rz_{0.8}/Ra_{0.8}$ to 2.00 or more, it is possible to prevent unevenness from becoming excessively uniform, and to make scratches and defects on the first main surface less noticeable. Further, by setting $Rz_{0.8}/Ra_{0.8}$ to 5.50 or less, it is possible to easily suppress the occurrence of subtle luminance unevenness of the transmitted light (occurrence of scintillation) due to the concave portion having a specific depth or the convex portion having a specific height. In addition, by setting $Rz_{0.8}/Ra_{0.8}$ to 5.50 or less, the uniformity of the unevenness can be ensured, and graininess on the surface of the anti-glare film can be easily suppressed.

The anti-glare film of the present invention has an $Rz_{0.8}$ of the first main surface of preferably 0.80 μm or less, more preferably 0.50 μm or less, and further preferably 0.40 μm or less.

By setting $Rz_{0.8}$ to 0.80 μm or less, scintillation caused by singular points can be easily suppressed. Further, by setting $Rz_{0.8}$ to 0.80 μm or less, it is possible to easily suppress graininess on the surface of the anti-glare film. The lower limit of $Rz_{0.8}$ is not particularly limited, but is preferably 0.10 μm or more, and more preferably 0.20 μm or more.

<<Equation (5)>>

The anti-glare film of the present invention preferably satisfies, when the 20-degree specular glossiness and the 60 degree specular glossiness measured from the first main surface side in accordance with JIS Z8741: 1997 are defined as $G_{20}$ and $G_{60}$, respectively, the following Equation (5).

$$G_{60}/G_{20} \leq 2.50 \quad (5)$$

When $G_{60}/G_{20}$ is 2.50 or less (Equation (5) is satisfied), the uniformity of gloss of the entire first main surface is increased, the design of the member to which the anti-glare film is attached becomes good, and therefore the sense of luxury can be increased. These effects are especially noticeable in cases where the surface area of the member to which the anti-glare film is to be applied is large, the member to which the anti-glare film is to be applied is a member having a curved surface, and the member to which the anti-glare film is to be applied can be transformed into a curved surface. Examples of members having a curved surface include members in which a display element or an image display device is wound around a cylindrical pillar. Examples of members that can be transformed into a curved surface include a projection screen, a rollable display element, and an image display device.

$G_{60}/G_{20}$ is preferably 2.25 or less, more preferably 2.00 or less, and further preferably 1.75 or less. The lower limit of $G_{60}/G_{20}$ is not particularly limited, but is preferably 1.10 or more.

When the surface shape of the first main surface satisfies Equations (1) to (4), $G_{60}/G_{20}$ can be easily set in the above range.

The specular glossiness is preferably measured in a state where reflection on the second main surface side is suppressed. For example, it is preferable to prepare a sample in which the second main surface side of the anti-glare film has been attached to a black plate via an optical transparent adhesive sheet, and measure the specular glossiness from the first main surface side of the sample. The difference in refractive index between the material forming the outermost surface of the anti-glare film on the second main surface side and the material forming the transparent adhesive layer is preferably less than 0.05.

<Second Main Surface>

The anti-glare film of the present invention has a second main surface opposite to the first main surface.

The surface shape on the second main surface side is not particularly limited, but it is preferably substantially smooth. Substantially smooth means that the $Ra_{0.8}$ less than 0.03 μm, and is preferably 0.02 μm or less.

<Transparent Substrate>

The anti-glare film preferably has a transparent substrate, from the viewpoint of ease of production of the anti-glare film and the handleability of the anti-glare film. When the anti-glare film has a resin layer on the transparent substrate, the surface of the transparent substrate opposite to the resin layer is the second main surface.

The transparent substrate preferably has transparency, smoothness, and heat resistance, and is preferably excellent in terms of mechanical strength. Examples of the transparent substrate include plastic films such as polyester, triacetyl cellulose (TAC), cellulose diacetate, cellulose acetate butyrate, polyamide, polyimide, polyamide-imide, aramid, polyether sulfone, polysulfone, polypropylene, polymethyl pentene, polyvinyl chloride, polyvinyl acetal, polyether ketone, polymethyl methacrylate, polycarbonate, polyurethane, and amorphous olefin (cyclo-olefin-polymer: COP). The transparent substrate may be a combination of two or more plastic films attached together.

Among them, from the viewpoint of mechanical strength and dimensional stability, stretched, and particularly, biaxially-stretched polyester (polyethylene terephthalate (PET), polyethylene naphthalate, and the like) is preferred. Further, polyester is suitable because the permeability of solvents and monomers is weak and a surface shape satisfying the above Equation (1) can be easily formed.

Even among the above, acrylics such as polymethylmethacrylate, polyesters, and COPs are preferable because they have low hygroscopicity and are less likely to warp, and can thus easily cope with upsizing. Further, in the case of an acrylic film such as polymethylmethacrylate, when the in-plane phase difference is 10 nm or less, and further 5 nm or less, such an acrylic film is preferable because the uniformity of the film quality is high, so that dimensional stability and bending resistance can be improved.

Among the above, polyamide, polyimide, polyamide-imide, polyaramid, TAC, acrylic, and biaxially-stretched polyester (provided that the biaxially stretched polyester has a small in-plane phase difference and a large Nz coefficient) are preferable because bending resistance tends to be improved and application to curved image display devices and foldable image display devices is easier. A polyester having a small in-plane phase difference means that the film thickness is 10 μm to 90 μm and the in-plane phase difference is 1500 nm or less, preferably 1200 nm or less, more preferably 1000 nm or less, and further preferably 800 nm or less. A biaxially stretched polyester having a small in-plane phase difference can be easily produced by simultaneous biaxial stretching. In order to improve the physical properties, such as elastic modulus and tear strength of the biaxially stretched polyester as a plastic film, the in-plane phase difference is preferably 200 nm or more, and more preferably 400 nm or more. Further, in order to further improve the physical properties, it is better to consider the balance between the birefringence in the in-plane direction and the birefringence in the film thickness direction. The index used for this is the Nz coefficient. Since the Nz coefficient is affected by the crystallinity and orientation inside the film, the Nz coefficient relates to the properties of the entire film. In the case of polyethylene terephthalate (PET), the Nz coefficient is, for example, conventionally 2 to 4, but particularly when bending into a curved surface shape or using in the foldable or rollable applications described later, the Nz coefficient is 5 or more, further 8 or more, and most preferably 10 or more. The upper limit of the Nz coefficient is about 70. When physical strength is important, the upper limit of the Nz coefficient is about 30.

The in-plane phase difference (Re) is represented by the following Equation (A) by the refractive index nx in the slow axis direction, which is the direction in which the refractive index is at its largest in the plane of the plastic film, the refractive index ny in the fast axis direction, which is the direction orthogonal to the slow axis direction in the plane, and a thickness T [nm] of the plastic film. From the following Equation (A), it can be seen that a small in-plane phase difference tends to improve bending resistance because the degree of orientation is low. The in-plane phase difference (Re) can be measured by, for example, instruments having the trade name "RETS-100" manufactured by Otsuka Electronics Co., Ltd., and the trade names "KOBRA-WR" or "PAM-UHR100" manufactured by Oji Scientific Instruments.

$$\text{In-plane phase difference } (Re)=(nx-ny)\times T[\text{nm}] \tag{A}$$

The Nz coefficient is represented by the following Equation (B) by the refractive index nz in the thickness direction of the plastic film, and the above-described nx and ny.

$$Nz \text{ coefficient}=(nz-nx)/(ny-nx) \tag{B}$$

It is preferable that the plastic film does not crack or fracture after the following folding test is consecutively performed 100,000 times (more preferably 300,000 times). Further, it is more preferable for the plastic film that, when the measurement sample is placed on a horizontal table after the following folding test is consecutively performed 100,000 times (more preferably 300,000 times), an angle at which the edge of the sample rises from the table is 15 degrees or less. The fact that the angle at which the edge of the sample rises is 15 degrees or less means that creases caused by the consecutive folding are less likely to occur. When the plastic film has a slow phase axis and a fast phase axis, a plastic film exhibiting the above-described results (no cracks, fractures, or creases caused by folding) in both directions is preferable.

It is preferable that the anti-glare film of the present invention also have the same bending resistance as described above. At this time, in cases where the resin layer is folded inward as well as in cases where the resin layer is folded outward, it is preferable that the resin layer has a bending resistance for consecutively 100,000 times, and more preferably 300,000 times or more.

<<Folding Test>>

A strip-shaped sample with a short side of 30 mm and a long side of 100 mm is cut from the plastic film. Both ends on the short side (30 mm) of the sample are fixed (the area 10 mm from the edge is fixed) to a durability tester (trade name "DLDMLH-FS", manufactured by Yuasa System Co., Ltd.), and a consecutive folding test of folding by 180 degrees was carried out 100,000 times (or 300,000 times). The test conditions of the durability tester are preferably, for example, a reciprocating speed of 80 rpm (folds per minute), a test stroke of 60 mm, and a bending angle of 180 degrees. A more detailed method of folding test is shown below.

After the folding test, the strip-shaped sample is placed on a horizontal table and the angle at which the edge of the sample rises from the table is measured. If the sample cracks or fractures during the test, it is treated as being "cracked" or "fractured".

When the plastic film has a slow phase axis and a fast phase axis, two types of samples, which are a sample with the short side as the slow phase axis and a sample with the short side as the fast phase axis, are prepared and the test is carried out on the two types of the sample.

<<Details of the Folding Test>>

As illustrated in FIG. 5(A), in the consecutive folding test, first, a side portion S2a of a sample S2 and a side portion S2b facing the side portion S2a are fixed by fixing portions 15 arranged in parallel. The fixing portions 15 can be slidably moved in the horizontal direction.

Next, as illustrated shown in FIG. 5(B), the fixing portions 15 are moved closer to each other so as to deform the sample S2 and produce a fold. In addition, as illustrated in FIG. 5(C), the fixing portions 15 are moved to a position where a gap ϕ between the two opposing side portions of the sample S2 fixed by the fixing portions 15 is, for example, 7 mm, and then the fixing portions 15 are moved in the opposite direction to eliminate the deformation of the sample S2.

By moving the fixing portions 15 as illustrated in FIGS. 5(A) to 5(C), the sample S2 can be folded 180 degrees. Further, by performing the consecutive folding test so that a bent portion S2d of the sample S2 does not protrude from the lower edge of the fixing portions 15, and controlling the gap when the fixing portions 15 are closest to each other to 7 mm, the gap between the two opposing side portions of the sample S2 can be 7 mm.

It is preferable that the above-described cracking, fracturing, and creases due to folding do not occur as a result of performing the test 100,000 times or 300,000 times at such a gap ϕ. Most preferably, cracking, fracturing, and creases due to folding are all good even when the gap ϕ even is as small as 5 mm, 3 mm, 2 mm, and 1 mm. By having such bending resistance, the anti-glare film of the present invention can be satisfactorily used for various image display devices with design properties, such as a foldable type image display device (image display device capable of being folded), a rollable image display device (image display device that can be rolled and transformed from a curved shape to a planar shape), and an image display device having a curved shape.

From the viewpoint of transparency, the polyimide is preferably a fluorinated polyimide or a polyimide containing a cyclic aliphatic group. Further, as the polyaramid, from the viewpoint of transparency, a polyaramid having a halogen group is preferable.

The lower limit of the thickness of the transparent substrate is preferably 5 μm or more, more preferably 20 μm or more, further preferably 30 μm or more, and even further preferably 50 μm or more, and the upper limit is preferably 300 μm or less, more preferably 200 μm or less, further preferably 150 μm or less, and even further preferably 90 μm or less. By increasing the thickness of the transparent substrate, it becomes easier to suppress warping of the anti-glare film, and by reducing the thickness of the transparent substrate, it becomes easier to achieve a thinner member (image display device and the like) applying the anti-glare film.

When applying the anti-glare film to a foldable type image display device, a rollable type image display device, or an image display device having a curved surface shape, from a viewpoint of strength, the lower limit of the thickness of the transparent substrate is preferably 5 μm or more, more preferably 10 μm or more, further preferably 18 μm or more, and even further preferably 30 μm or more, and from the viewpoint of bending resistance, the upper limit is preferably 90 μm or less, more preferably 60 μm or less, and further preferably 40 μm or less. When applying the anti-glare film to a foldable type image display device, a rollable type image display device, or an image display device having a curved surface shape, the transparent substrate is preferably polyamide, polyimide, polyamide-imide, polyaramid, TAC, acrylic, biaxially-stretched polyester (provided that the biaxially stretched polyester has a small in-plane phase difference and a large Nz coefficient), or amorphous olefin (Cyclo-Olefin-Polymer: COP).

When applied to a foldable type image display device in which a gap ϕ between the two opposing surfaces when folded is 5 mm or less, the transparent substrate is preferably polyimide, polyamide-imide, polyaramid, biaxially-stretched polyester (provided that the biaxially stretched polyester has a small in-plane phase difference and a large Nz coefficient), or COP. These resin-based films are preferable not only because they have good consecutive folding performance, but also because their creases are not easily visible. In the case of an acrylic film, these resin-based films are also preferable because they can improve the applicability to three-dimensional molding such as TOM forming and in-mold forming.

—Example of Suitable Thickness of Each Resin Type—

The thickness of a PET film is, from the viewpoint of mechanical strength, preferably 5 μm or more, and more preferably 10 μm or more. Further, in the case of a PET film having a high Re and a low Nz coefficient, from the viewpoint of bending resistance, the thickness is preferably 45 μm or less, more preferably 30 μm or less, still more preferably 20 μm or less. In addition, in the case of a PET film having a low Re and a high Nz coefficient, from the viewpoint of bending resistance, the thickness is preferably 80 μm or less, more preferably 50 μm or less, further preferably 30 μm or less, even further preferably 20 μm or less.

The thickness of a COP film is, from the viewpoint of mechanical strength, preferably 5 μm or more, and more preferably 10 μm or more. Further, from the viewpoint of bending resistance, the thickness of the COP film is preferably 100 μm or less, more preferably 80 μm or less, further preferably 60 μm or less, even further preferably 30 μm or less, and still even further preferably 20 μm or less.

The thickness of a TAC film is, from the viewpoint of mechanical strength, preferably 5 μm or more, and more preferably 10 μm or more. Further, from the viewpoint of bending resistance, the thickness of the TAC film is preferably 50 μm or less, more preferably 30 μm or less, and further preferably 20 μm or less.

When the above-described folding test is performed on the anti-glare film, even if it does not appear that the anti-glare film has a defective appearance or cracks either before or after the consecutive folding test, creases may be formed at the bent portions and microcracks may occur, and there is a risk of a defective appearance, specifically, cloudiness or delamination (defective adhesion) starting from microcracks may occur. Suppression of creases and microcracks at the bent portions is extremely important for use as an image display device. For this reason, the anti-glare film is preferably flexible.

The creases are observed visually. When observing the creases, the bent portions are thoroughly observed using transmitted light and reflected light in a bright room (800 lux to 2000 lux) illuminated with white light, and both the inner portion and the outer portion of the bent portions when folded are to be observed. The observation of the creases is carried out in an environment where the temperature is 23±5° C. and the relative humidity is 30% or more and 70% or less.

The microcracks are observed using a digital microscope. Examples of the digital microscope include the VHX-5000 manufactured by Keyence Corporation. The microcracks are observed by selecting ring illumination as the illumination for the digital microscope, and carrying out the observation with a dark field and reflected light. Specifically, first, the sample after the consecutive folding test is slowly unfolded, and the sample is fixed to the stage of the microscope with tape. At this time, if the creases are strong, the observation area should be as flat as possible. However, the planned observation area (bent portion) near the center of the sample should not be touched by hand and no force should be applied. Further, both the inner portion and the outer portion when folded are to be observed. The observation of the microcracks is carried out in an environment where the temperature is 23±5° C. and the relative humidity is 30% or more and 70% or less.

In the observation of the creases and the microcracks, in a case where the sample before the consecutive folding test is placed at the fixing portion of a durability tester and folded once so that the position to be observed can be easily grasped, as illustrated in FIG. 6, it is preferable to draw a mark A1 at both edges E located in the direction orthogonal to the folding direction FD in the bent portion S2*d* with an oil-based pen or the like to indicate where the bent portion is. Further, in the case of a sample in which no creases or the like are observed after the consecutive folding test, in order to prevent the observation position of the sample from becoming unknown, it is preferred to take the sample out of the durability tester after the consecutive folding test and draw a line A2 (dotted line in FIG. 6) connecting the marks A1 at either edge E of the both of the bent portion S2*d* with an oil-based pen or the like. When observing creases, the entire bent portion S4, which is an area enclosed by the marks A1 and the lines A2, is visually observed. When observing microcracks, the position of the microscope is adjusted so that the center of the microscope visual field range (in FIG. 6, the range enclosed by the alternate long and short dash line) is the center of the bent portion S2*d*.

Further, when the above-described consecutive folding test is performed on the anti-glare film, the adhesive properties between the transparent substrate and the resin layer may deteriorate. Therefore, at the bent portion of the anti-glare film after the above consecutive folding test, when the vicinity of the interface between the resin layer and the transparent substrate is observed with a digital microscope, it is preferable that no peeling or the like is observed at the vicinity of the interface between the resin layer and the transparent substrate. Examples of the digital microscope include the VHX-5000 manufactured by Keyence Corporation.

The thickness of the transparent substrate can be measured with a digimatic standard outside micrometer (manufactured by Mitutoyo, product number "MDC-25SX") or the like. The thickness of the transparent substrate may be such that the average value obtained by measuring any 10 points is the above-described numerical value. Further, the variation in the thickness of the transparent substrate is preferably in the range of ±8% of the average value, more preferably in the range of ±4% of the average value, and further preferably in the range of ±3% of the average value. For example, when the average value of the thickness is 50 µm, each thickness value is preferably within the range of 46 to 54 µm, more preferably within the range of 48 to 52 µm, and further preferably within the range of 48.5 to 51.5 µm.

The surface of the transparent substrate may be subjected to physical treatment such as corona discharge treatment or chemical treatment, or an easy-adhesion layer may be formed, in order to improve adhesiveness.

<Resin Layer>

The above-described first main surface is formed on the surface of the resin layer.

The first main surface of the resin layer can be formed by, for example, (A) a method using an embossing roll, (B) an etching treatment, (C) forming by a mold, (D) film-formation by coating, and the like. Among these methods, from the viewpoint of easily obtaining a stable surface shape, method (C) forming by a mold is suitable, and from the viewpoint of productivity and compatibility with various product types, method (D) film-formation by coating, is suitable.

In method (D), as will be described later, there are many factors causing the surface shape to vary, and each factor influences the others in a complex manner. Moreover, differences in the model of the production apparatus are also factors causing variability. Therefore, the above-described method (C) is preferable.

<<Thickness>>

The thickness of the resin layer is, from the viewpoint of a balance among curl suppression, mechanical strength, hardness, and toughness, preferably 2 to 10 µm, and more preferably 4 to 8 µm.

The thickness of the resin layer can be calculated by, for example, selecting 20 arbitrary points in a cross-sectional photograph of the anti-glare film by a scanning transmission electron microscope (STEM) and averaging them. The acceleration voltage of the STEM is preferably 10 kv to 30 kV, and the magnification of the STEM is preferably 1000 to 7000 times.

The variation in the film thickness of the resin layer is preferably within ±15%, more preferably within ±10%, further preferably within ±7%, and even further preferably within 5% of the average film thickness.

<<Components>>

The resin layer mainly includes a resin component and, optionally, particles. Further, the resin layer may contain additives such as a refractive index modifier, for example, high refractive index particles and low refractive index particles, an antistatic agent, an anti-fouling agent, an ultraviolet absorber, a light stabilizer, an antioxidant, a viscosity modifier, a thermal polymerization initiator.

<<Forming By Mold>>

Forming by a mold can be carried out by producing a mold having a shape complementary to the surface shape of the first main surface, pouring the material constituting the resin layer such as the resin component into the mold, curing the mold, and then removing from the mold. When using a transparent substrate, the material constituting the resin layer is poured into the mold, the transparent substrate is superimposing thereon, the resin component and the like are cured, and the cured product including the transparent substrate is removed from the mold. When the resin layer contains particles or additives, the materials to be poured into the mold may also contain particles or additives.

As a method of forming the shape complementary to the surface shape of the first main surface into the mold, for example, laser microfabrication can be employed. Specifically, a surface shape satisfying the above Equations (1) and Equation (2) or the like is designed by simulation and a male mold reproducing the designed surface shape by laser microfabrication is produced. The mold (female mold) for forming can be obtained by inverting the male mold.

The resin component preferably includes a cured product of a thermosetting resin composition or a cured product of an ionizing radiation-curable resin composition. From the viewpoint of improving the mechanical strength, it is more preferable to include a cured product of an ionizing radiation-curable resin composition. As specific examples of the thermosetting resin composition and the ionizing radiation-curable resin composition, the compositions described as examples in "Formation of a film by coating" described below can be used.

<<Formation of a Film By Coating>>

The formation of a film by coating can be carried out by coating a coating liquid for forming a resin layer containing the resin component or a precursor thereof and particles onto a transparent substrate by a known coating method such as gravure coating or bar coating, and then drying and curing as required. In the case of this method, the surface shape can be adjusted based on the average particle size of the particles, the content of the particles, the ratio of the film thickness to the average particle size, the presence or absence of particle agglomeration, the cross-linking density of the binder resin, the viscosity of the coating liquid, the leveling property of the coating liquid, the drying conditions of the coating liquid and the like. Specifically, it is preferable that the average particle size of the particles is in the range described later.

As the particles, it is preferable to include particles having an average particle size of 0.3 to 5.0 μm (hereinafter, referred to as "large particles"). If the average particle size is less than 0.3 μm, a sufficient uneven shape cannot be formed on the surface of the resin layer, and the anti-glare properties of the anti-glare film of the present invention may be insufficient. If the average particle size exceeds 5.0 μm, the uneven shape of the surface of the resin layer is large, which may cause a scintillation problem. By setting the average particle size of the large particles in the above range, the shape of the first main surface can be easily formed into the shape described above. The average particle size of the large particles is preferably 1.5 to 4.5 μm, and more preferably 2.0 to 4.0 μm.

Further, the variation in the average particle size of the large particles is preferably such that 90% or more of the particles are ±0.5 μm within the average particle size, more preferably ±0.4 μm within the average particle size, and further preferably ±0.3 μm within the average particle size.

By setting the variation in the average particle size to within the above range, the probability of the existence of particles having an extremely large particle size is reduced, and the shape of the first main surface can be easily formed into the shape described above.

The average particle size of the large particles can be calculated by the following operations (i) to (iii).

(i) A transmission observation image of the anti-glare film is captured with an optical microscope. The magnification is preferably 500 to 2000 times.

(ii) A random 10 large particles are extracted from the observation image, and the particle size of each large particle is calculated. The particle size is measured as the distance between two straight lines for a combination of two straight lines maximizing the distance between them when a cross section of the large particle is sandwiched between two arbitrary parallel straight lines.

(iii) The same operation is performed 5 times on the observation image on a separate screen of the same sample, and the value obtained from the number average of the particle sizes for a total of 50 particles is defined as the average particle size of the large particles.

As the large particles, either organic particles or inorganic particles can be used.

Examples of the organic particles include particles composed of polymethylmethacrylate, polyacrylic-styrene copolymer, melamine resin, polycarbonate, polystyrene, polyvinyl chloride, benzoguanamine-melamine-formaldehyde condensate, silicone, fluororesin, polyester resin, and the like.

Examples of the inorganic particles include particles composed of silica, alumina, zirconia, titania, and the like.

Among the above-described large particles, organic particles are preferable from the viewpoint of ease of dispersion control. In addition, organic particles have a light specific gravity, and when used in combination with the inorganic fine particles described later, the organic particles easily emerge near the surface of the resin layer, and the proportion of long-cycle unevenness can be reduced. As a result, the shape of the first main surface can be more easily made into the above-described shape.

The content of the large particles is preferably 2 to 25% by mass, and more preferably 3 to 20% by mass, of the total solid content forming the resin layer.

In addition to the large particles, the resin layer preferably includes inorganic particles having an average particle size of 1 to 50 nm (in this specification, sometimes referred to as "inorganic fine particles").

Examples of the inorganic fine particles include fine particles composed of silica, alumina, zirconia, titania, and the like. Among these, silica, which easily suppresses the occurrence of internal haze, is preferable.

Including the inorganic fine particles in the coating liquid for forming a resin layer enables an appropriate interval to be maintained between adjacent large particles, and, due to the fact that the large particles having a light specific gravity (provided that the large particles are organic particles) tend to rise up to near surface of the resin layer, the shape of the first main surface to be easily made into the above-described shape.

The average particle size of the inorganic fine particles is preferably 2 to 45 nm, and more preferably 5 to 40 nm.

The average particle size of the inorganic fine particles can be calculated by the following operations (i) to (iii).

(i) A cross-section of the anti-glare film is captured with a TEM or a STEM. The acceleration voltage of TEM or STEM is preferably 10 kv to 30 kV, and the magnification is preferably 10,000 to 300,000 times.

(ii) A random 10 inorganic fine particles are extracted from the observation image, and the particle size of each inorganic fine particle is calculated. The particle size is measured as the distance between two straight lines for a combination of two straight lines maximizing the distance between them when a cross section of the inorganic fine particle is sandwiched between two arbitrary parallel straight lines.

(iii) The same operations are performed 5 times on the observation image on a separate screen of the same sample, and the value obtained from the number average of the particle sizes for a total of 50 particles is defined as the average particle size of the inorganic fine particles.

The content of the inorganic fine particles is preferably 1 to 50.0% by mass, more preferably 10 to 47% by mass, and further preferably 20 to 45% by mass, of the total solid content forming the resin layer. If the content is less than 1% by mass, it is difficult to properly maintain the interval between the large particles, and the resin layer may not have a smooth uneven shape. If the content exceeds 50.0% by mass, a problem of fogginess may occur.

The ratio of the content of the large particles to the content of the inorganic fine particles is, in terms of mass ratio, preferably 1:15 to 6:1, more preferably 1:13 to 1:1, and further preferably 1:12 to 1:5.

The resin component of the resin layer preferably includes a cured product of a thermosetting resin composition or a cured product of an ionizing radiation-curable resin composition. From the viewpoint of further improving mechanical strength, the resin component more preferably includes a cured product of an ionizing radiation-curable resin composition.

The thermosetting resin composition is a composition which includes at least a thermosetting resin and is cured through heating.

Examples of the thermosetting resin include acryl resins, urethane resins, phenol resins, urea melamine resins, epoxy resins, unsaturated polyester resins, silicone resins, and the like. A curing agent is added to the thermosetting resin composition as necessary.

The ionizing radiation-curable resin composition is a composition including a compound (hereinafter, also referred to as "ionizing radiation-curable compound") including an ionizing radiation curable functional group. Examples of the ionizing radiation curable functional group include ethylenic unsaturated linking groups such as (meth)acryloyl groups, vinyl groups, and allyl groups, epoxy groups, oxetanyl groups, and the like. The ionizing radiation-curable compound is preferably a compound having an ethylenic unsaturated linking group, and more preferably a compound having two or more ethylenic unsaturated linking groups, and among them, a polyfunctional (meth)acrylate-based compound having two or more ethylenic unsaturated linking groups is still more preferred. As the polyfunctional (meth)acrylate-based compound, any of monomers and oligomers can be used.

Ionizing radiation refers to a ray having an energy quantum high enough to polymerize or crosslink molecules among electromagnetic rays and charged particle radiation, and generally, an ultraviolet ray (UV) or an electron beam (EB) is used, and additionally, electromagnetic waves such as an X-ray and a γ ray and charged particle radiation such as an α ray and an ion ray can also be used.

Among the polyfunctional (meth)acrylate-based compounds, examples of bifunctional (meth)acrylate-based monomers include ethylene glycol di(meth)acrylate, bisphenol A tetraethoxy diacrylate, bisphenol A tetrapropoxy diacrylate, 1,6-hexanediol diacrylate, and the like.

Examples of tri- or more functional (meth)acrylate-based monomers include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, isocyanurate-modified tri(meth)acrylate, and the like.

In addition, the (meth)acrylate-based monomers may be monomers having a partially-modified molecular frame, and it is also possible to use monomers modified using ethylene oxide, propylene oxide, caprolactone, isocyanuric acid, alkyl, cyclic alkyl, aromatic series, bisphenol, or the like.

Examples of polyfunctional (meth)acrylate-based oligomers include acrylate-based polymers such as urethane (meth)acrylate, epoxy (meth)acrylate, polyester (meth)acrylate, and polyether (meth)acrylate; and the like.

Urethane (meth)acrylate can be obtained by, for example, the reaction of a polyvalent alcohol, an organic diisocyanate, and hydroxyl (meth)acrylate.

In addition, epoxy (meth)acrylate is preferably (meth)acrylate obtained by reacting a tri- or more functional aromatic epoxy resin, an alicyclic epoxy resin, an aliphatic epoxy resin, or the like with (meth)acrylic acid; (meth)acrylate obtained by reacting a bi- or more functional aromatic epoxy resin, an alicyclic epoxy resin, an aliphatic epoxy resin, or the like, with a polybasic acid and (meth)acrylic acid; and (meth)acrylate obtained by reacting a bi- or more functional aromatic epoxy resin, an alicyclic epoxy resin, an aliphatic epoxy resin, or the like, with phenols and (meth)acrylic acid.

A monofunctional (meth)acrylate may be used in combination as the ionizing radiation-curable compound for the purpose of adjusting the viscosity of the coating liquid for forming a resin layer. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like.

The ionizing radiation-curable compound can be singly used, or a combination of two or more ionizing radiation-curable compounds can be used.

In a case in which the ionizing radiation-curable compound is an ultraviolet-curable compound, the ionizing radiation-curable composition preferably includes additives such as a photopolymerization initiator and a photopolymerization accelerator.

As the photopolymerization initiator, it is possible to select one or more from acetophenone, benzophenone, α-hydroxy alkylphenone, Michler's ketone, benzoin, benzyl dimethyl ketal, benzoyl benzoate, α-acyloxim ester, thioxanthones, and the like.

The photopolymerization accelerator is capable of increasing the curing rate by reducing polymerization hindrances caused by the air during curing, and, for example, it is possible to select one or more from p-dimethyl amino benzoic acid isoamyl ester, p-dimethylamino benzoic acid ethyl ester, and the like.

For the coating liquid for forming a resin layer, generally, a solvent is used to adjust viscosity or enable the dissolution or dispersion of individual components. Since the surface shape of the resin layer that has been subjected to coating and drying processes differs depending on the kind of the solvent, the solvent is preferably selected in consideration of the saturated vapor pressure of the solvent, the permeability of the solvent in the transparent substrate, and the like.

Specifically, examples of the solvent include ketones (acetone, methyl ethyl ketone, methyl isobutyl ketone, cyclohexanone, and the like), ethers (dioxane, tetrahydrofuran, and the like), aliphatic hydrocarbons (hexane and the like), alicyclic hydrocarbons (cyclohexane and the like), aromatic hydrocarbons (toluene, xylene, and the like), halogenated carbons (dichloromethane, dichloroethane, and the like), esters (methyl acetate, ethyl acetate, butyl acetate, and the like), alcohols (isopropanol, butanol, cyclohexanol, and the like), cellosolves (methyl cellosolve, ethyl cellosolve, and the like), glycol ethers (propylene glycol monomethyl ether acetate and the like), cellosolve acetates, sulfoxides (dimethyl sulfoxides and the like), amides (dimethyl formamide, dimethyl acetamide, and the like), and a mixture of the above-described solvents may also be used.

When forming the resin layer from the coating liquid for forming a resin layer, it is preferable to control the drying conditions.

The drying conditions can be controlled using the drying temperature and the wind speed in a dryer. Specifically, the drying temperature is preferably set in a range of 30° C. to 120° C., and the wind speed is preferably set in a range of 0.2 m/s to 50 m/s. In order to control the surface shape of the resin layer using drying, it is preferable to carry out the application of ionizing radiation after drying of the coating liquid.

The coating liquid for forming a resin layer may contain a leveling agent. Examples of the leveling agent include silicone-based leveling agents and fluorine-based leveling agents.

However, if the surface shape of the resin layer is excessively leveled, it may be difficult for the first main surface to have the above-described surface shape. Therefore, the added amount of the leveling agent is preferably 0.01 to 0.5% by weight, and more preferably 0.05 to 0.2% by weight based on the total solid content of the coating liquid for forming a resin layer.

The resin layer may contain an ultraviolet absorber as described above. In particular, when the anti-glare film is arranged on an organic EL display element, it is preferable that the resin layer contain an ultraviolet absorber because deterioration of the organic EL display element can be suppressed.

The ultraviolet absorber is preferably an organic ultraviolet absorber having a maximum absorption wavelength of 200 to 360 nm. Further, in order to improve visibility, the ultraviolet absorber is preferably an ultraviolet absorber that does not easily emit fluorescence of 380 to 490 nm when light in the ultraviolet region is absorbed.

The ultraviolet absorber is preferably one or more selected from benzotriazole-based ultraviolet absorbers, triazine-based ultraviolet absorbers, benzophenone-based ultraviolet absorbers, and malonate-based ultraviolet absorbers. Among these, one or more selected from ultraviolet absorbers having no more than two aromatic rings in the molecule are preferred. Benzoxazine-based ultraviolet absorbers and anthracene-based ultraviolet absorbers tend to emit fluorescence of 380 to 490 nm when absorbing light in the ultraviolet region.

It is preferable to use two or more ultraviolet absorbers as the ultraviolet absorber. The combination of the two or more ultraviolet absorbers is preferably the following (i) or (ii). In the case of (i), two or more ultraviolet absorbers may be selected from only benzotriazole-based ultraviolet absorbers, or two or more ultraviolet absorbers may be selected from only triazine-based ultraviolet absorbers.

(i) Combination of two or more ultraviolet absorbers selected from benzotriazole-based ultraviolet absorbers and triazine-based ultraviolet absorbers.

(ii) Combination of one or more ultraviolet absorbers selected from benzotriazole-based ultraviolet absorbers and triazine-based ultraviolet absorbers, and one or more ultraviolet absorbers selected from benzophenone-based ultraviolet absorbers, malonate-based ultraviolet absorbers, oxalic acid anilide-based ultraviolet absorbers, and indole-based ultraviolet absorbers.

The content of the ultraviolet absorber is preferably 0.1 to 20 parts by mass, and more preferably 1 to 10 parts by mass based on 100 parts by mass of the resin component. When a plurality of ultraviolet absorbers are included, the total amount of the plurality of ultraviolet absorbers is preferably in the above range.

<Other Layers>

The anti-glare film may have other layers such as a low refractive index layer, an anti-fouling layer, an antistatic layer, and a primer layer. Hereinafter, embodiments of a low refractive index layer, which is a typical example of other layers, will be described.

<<Low Refractive Index Layer>>

The anti-glare film may have a low refractive index layer. The low refractive index layer is preferably arranged so that the surface of the low refractive index layer serves as the first main surface of the anti-glare film. For example, when the anti-glare film has a transparent substrate, a resin layer, and a low refractive index layer, it is preferable for the lamination order to be transparent substrate, resin layer, and low refractive index layer, and to arrange these layers such that the surface of the low refractive index layer serves as the first main surface of the anti-glare film.

From the viewpoint of anti-reflection properties, the upper limit of the refractive index of the low refractive index layer is preferably 1.48 or less, more preferably 1.45 or less, further preferably 1.40 or less, even further preferably 1.38 or less, and still even further preferably 1.35 or less.

If the refractive index of the low refractive index layer is set too low, the physical strength of the low refractive index layer may decrease. Therefore, the lower limit of the refractive index of the low refractive index layer is preferably 1.10 or more, more preferably 1.20 or more, further preferably 1.26 or more, even further preferably 1.28 or more, and still even further preferably 1.30 or more.

The thickness of the low refractive index layer is preferably 80 to 120 nm, more preferably 85 to 110 nm, and further preferably 90 to 105 nm.

Methods for forming a low refractive index layer can be roughly divided into the wet methods and dry methods. Examples of wet methods include a method of forming by a sol-gel method using a metal alkoxide or the like, a method of forming by coating a resin having a low refractive index such as a fluororesin, and a method of forming by coating a coating liquid for forming a low refractive index layer containing a binder resin composition and low refractive index particles. Examples of dry methods include a method of selecting particles having a desired refractive index from the low refractive index particles described below and forming by a physical vapor deposition method or a chemical vapor deposition method.

A wet method is excellent in terms of production efficiency. Among the wet methods, forming by a coating liquid for forming a low refractive index layer in which low refractive index particles are contained in a binder resin composition is preferable.

Any low refractive index particles can be used without limitation, regardless of whether they are particles composed of an inorganic compound such as silica or magnesium fluoride, or particles composed of an organic compound. However, from the viewpoint of improving anti-reflection properties by lowering the refractive index, it is preferable to use particles with a structure having voids.

Particles with a structure having voids have minute voids inside, and are filled with a gas such as air having a refractive index of 1.0, so that the particles themselves have a low refractive index. Such particles having voids may be inorganic or organic porous particles and hollow particles, and examples thereof include porous silica, hollow silica particles, and porous polymer particles or hollow polymer particles using acrylic resin and the like.

The average particle size of the primary particles of the low refractive index particles is preferably 5 to 200 nm, more preferably 5 to 100 nm, and further preferably 10 to 80 nm.

The content of the low refractive index particles is preferably 50 to 400 parts by mass, and more preferably 100 to 300 parts by mass based on 100 parts by mass of the binder component.

The binder resin composition is preferably a curable resin composition. The curable resin composition turns into a cured product in the low refractive index layer and serves as a binder component.

Examples of the curable resin composition include a thermosetting resin composition and an ionizing radiation-curable resin composition. Among these, an ionizing radiation-curable resin composition is preferable. Examples of the thermosetting resin composition and the ionizing radiation-curable resin composition of the low refractive index layer include those described above as the thermosetting resin composition and the ionizing radiation-curable resin composition of the resin layer.

Regarding a radically polymerizable compound, when a (meth)acrylate-based compound having four or more ethylenic unsaturated linking groups is defined as a "polyfunctional (meth)acrylate-based compound" and a (meth)acrylate-based compound having two to three ethylenic unsaturated linking groups is defined as a "low-functional (meth)acrylate-based compound", the proportion of the low-functional (meth)acrylate-based compound in the radically polymerizable compound is preferably 60% by mass or more, more preferably 80% by mass or more, further preferably 90% by mass or more, even further preferably 95% by mass or more, and most preferably 100% by mass. The low-functional (meth)acrylate-based compound is preferable because the low-refractive index particles (particularly silica particles) tend to be uniformly dispersed in the low-refractive index layer and the coating film strength tends to increase.

Further, the low-functional (meth)acrylate-based compound is preferably a (meth)acrylate-based compound having two ethylenic unsaturated linking groups.

From the viewpoint of facilitating uniform dispersion of the low refractive index particles (particularly silica particles) in the low refractive index layer, it is preferred that the radically polymerizable compound forming the low refractive index layer modifies a part of the molecular skeleton. For example, as the radically polymerizable compound, a (meth)acrylate-based compound modified with ethylene oxide, propylene oxide, caprolactone, isocyanuric acid, alkyl, cyclic alkyl, aromatic, bisphenol or the like can also be used. In particular, the radically polymerizable compound is preferably a (meth)acrylate-based compound modified with an alkylene oxide such as ethylene oxide or propylene oxide.

The ratio of the alkylene oxide-modified (meth)acrylate-based compound in the radically polymerizable compound is preferably 60% by mass or more, more preferably 80% by mass or more, further preferably 90% by mass or more, even further 95% by mass or more, and most preferably 100% by mass. Further, the alkylene oxide-modified (meth)acrylate-based compound is preferably a low-functional (meth) acrylate-based compound, and more preferably a (meth)acrylate-based compound having two ethylenic unsaturated linking groups.

<Physical Properties of the Anti-Glare Film>

In the anti-glare film, the total light transmittance according to JIS K7361-1: 1997 is preferably 80% or more, more preferably 85% or more, and further preferably 90% or more.

The light incident surface when measuring the total light transmittance and the haze described later is the second main surface side.

The anti-glare film preferably has a haze according to JIS K7136: 2000 of 0.3 to 10%, more preferably 0.4 to 7%, and further preferably 0.5 to 5%.

The lower limit of the total thickness of the anti-glare film is preferably 7 μm or more, more preferably 22 μm or more, further preferably 32 μm or more, and even further preferably 52 μm or more. Further, the upper limit of the total thickness of the anti-glare film is preferably 310 μm or less, more preferably 210 μm or less, further preferably 160 μm, and even further preferably 100 μm.

When applying the anti-glare film to a foldable type image display device, a rollable type image display device, or an image display device having a curved surface shape, the upper limit of the total thickness of the anti-glare film is preferably 100 μm or less, more preferably 70 μm or less, and further preferably 50 μm or less.

<Size, Shape, and the Like>

The anti-glare film may be in the form of a sheet cut to a predetermined size, or in the form of a roll obtained by winding a long sheet into a roll. The size of the sheet is not particularly limited, but the maximum diameter is about 2 to 500 inches. The "maximum diameter" means the maximum length when any two points of the anti-glare film are connected. For example, when the anti-glare film is rectangular, the diagonal of the region is the maximum diameter. When the anti-glare film is circular, the diameter is the maximum diameter. From a design viewpoint such as harmony with the surrounding interior, it is preferable for the anti-glare film of the present invention to have a maximum diameter of 1000 mm or more because a more remarkable effect can be exhibited. More preferably, the maximum diameter of the anti-glare film is 1300 mm or more.

The width and length of the roll shape are not particularly limited, but generally, the width is about 500 to 3000 mm and the length is about 500 to 5000 m. The roll-shaped anti-glare film can be cut into a sheet shape according to the size of an image display device or the like. When cutting, it is preferable to exclude the edges of the roll where the physical properties are not stable.

The shape of the sheet is also not particularly limited, and may be, for example, a polygon (triangle, quadrangle, pentagon, and the like), a circle, or a random irregular shape. More specifically, when the anti-glare film has a quadrangular shape, the aspect ratio is not particularly limited as long as there is no problem with the display screen. For example, examples of the aspect ratio include horizontal: vertical=1:1, 4:3, 16:10, 16:9, 2:1 and the like. However, for in-vehicle applications and digital signage having abundant design properties, the aspect ratio is not limited to such examples.

[Optical Laminate]

An optical laminate of the present invention is formed by laminating the anti-glare film of the present invention with other optical members.

Examples of other optical members include a retardation film and a polarizer. When the optical laminate includes a polarizer, it is preferable to laminate a polarizer protective film on both sides of the polarizer. The anti-glare film of the present invention can also be used as the polarizer protective film on the light emitting side.

The surface of the optical laminate of the present invention on the light emitting side needs to be the first main surface of the anti-glare film of the present invention.

The optical laminate may be in the form of a sheet obtained by forming each member in the form of a sheet and then bonding them together, or in the form of a roll form in which roll-shaped members are bonded to each other. The sheet-shaped laminate and the roll-shaped laminate can be used by cutting to the size of the image display device. When cutting, it is preferable to exclude the edges where the physical properties are not stable.

[Polarization Plate]

The polarization plate according to the present invention comprises a polarizer, a transparent protection plate A arranged on one side of the polarizer, and a transparent protection plate B arranged on the other side of the polarizer, in which at least one selected from the group consisting of the transparent protection plate A and the transparent protection plate B is the anti-glare film according to the present invention as described above, and the anti-glare film is arranged so that the surface on the first main surface side faces the side opposite to the polarizer.

The polarization plate of the present invention may be used on the side opposite to the light emitting surface of the display element, but it is preferably used on the light emitting surface side of the display element.

<Polarizer>

Examples of the polarizer include sheet-type polarizers such as polyvinyl alcohol films, polyvinyl formal films, polyvinyl acetal films, ethylene-vinyl acetate copolymer-based saponified films, which are dyed with iodine, etc., and oriented; wire grid type polarizers made of a large number of metal wires arranged in parallel; coated polarizers to which a lyotropic liquid crystal or a dichroic guest-host material is applied; and multilayer thin film type polarizers. These polarizers may be reflective polarizers having a function of reflecting a non-transmissive polarized component.

<Transparent Protection Plate>

A transparent protection plate A is arranged on one side of the polarizer, and a transparent protection plate B is arranged on the other side.

Examples of the transparent protection plate A and the transparent protection plate B include a plastic film, glass, and the like. Examples of the plastic film include a polyester film, a polycarbonate film, a cycloolefin polymer film, and an acrylic film, and from the viewpoint of mechanical strength, a stretched film thereof is preferable. Examples of the glass include alkaline glass, nitride glass, soda-lime glass, borosilicate glass, and lead glass. Further, it is preferable to also use the glass serving as the transparent protection plate protecting the polarizer as another member of the image display device. For example, it is preferable to combine the glass substrate of the liquid crystal display element with the transparent protection plate that protects the polarizer.

It is preferable that the polarizer and the transparent protection plate are bonded to each other via an adhesive. As the adhesive, a general-purpose adhesive can be used, and a PVA-based adhesive is preferable.

In the polarization plate of the present invention, both the transparent protection plate A and the transparent protection plate B may be the anti-glare film of the present invention, but it is preferred that one of the transparent protection plate A and the transparent protection plate B is the anti-glare film of the invention. Further, when the polarization plate of the present invention is used as a polarization plate arranged on the light emitting surface side of the display element, it is preferable that the transparent protection plate on the light emitting surface side of the polarizer is the anti-glare film of the present invention. On the other hand, when the polarization plate of the present invention is used as a polarization plate arranged on the side opposite to the light emitting surface of the display element, it is preferable that the transparent protection plate on the side opposite to the light emitting surface of the polarizer is the anti-glare film of the present invention.

[Surface Plate for Image Display Device]

The surface plate for an image display device according to the present invention comprises an anti-glare film attached to a resin plate or a glass plate, in which the anti-glare film is the anti-glare film according to the present invention described above, and the anti-glare film is arranged so that the surface on the first main surface side faces the side opposite to the resin plate or the glass plate.

The surface plate for an image display device of the present invention is preferably arranged so that the surface on the side to which the anti-glare film is attached faces the surface side (the opposite side to the display element).

As the resin plate or glass plate, a resin plate or glass plate generally used as a surface plate of an image display device can be used.

From a strength viewpoint, the thickness of the resin plate or glass plate is preferably 10 μm or more. The upper limit of the thickness of the resin plate or the glass plate is usually 5000 μm or less, but in recent years, since it is preferable to make the image display device thinner, the upper limit is preferably 1000 μm or less, more preferably 500 μm or less, and further preferably 100 μm or less.

[Image Display Device]

The image display device according to the present invention comprises the anti-glare film according to the present invention described above arranged on a display element such that the surface on the first main surface side of the anti-glare film faces the side opposite to the display element, and the anti-glare film is arranged on the outermost surface (see FIG. 4).

Examples of the display element include a liquid crystal display element, an EL display element (organic EL display element, inorganic EL display element), a plasma display element, and the like, as well as an LED display element such as a micro LED display element. These display elements may have a touch panel function inside the display element.

Examples of the liquid crystal display method of the liquid crystal display element include an IPS method, a VA method, a multi-domain method, an OCB method, an STN method, a TSTN method, and the like. When the display element is a liquid crystal display element, a backlight is required. The backlight is arranged on the side of the liquid crystal display element opposite to the side having the anti-glare film.

The image display device of the present embodiment may be a touch panel-equipped image display device having a touch panel between the display element and the anti-glare film. In this case, the anti-glare film may be arranged on the outermost surface of the touch panel-equipped image display device, and the surface of the anti-glare film on the first main surface side may be arranged so as to face the side opposite to the display element.

The maximum diameter of the effective display area of the image display device is preferably 1000 mm or more, and more preferably 1300 mm or more. When the maximum diameter is 1000 mm or more, a more remarkable effect can be exhibited in terms of the design, such as harmony with the surrounding interior.

The effective display area of the image display device is the area in which an image can be displayed. For example, when the image display device has a housing that surrounds the display element, the area inside the housing is the effective image area.

The maximum diameter of the effective image area means the maximum length when any two points in the effective image area are connected. For example, when the effective image area is rectangular, the diagonal line of the area is the maximum diameter. When the effective image region is circular, the diameter of the region is the maximum diameter.

The image display device of the present invention may have a bezel (frame). It is preferable that the surface of the bezel (frame) is smooth. The anti-glare film of the image display device of the present invention has a very fine appearance and suppresses graininess. Therefore, the appearance of the image display device having a smooth bezel (frame) surface can approximate the appearance inside the bezel when the power is turned off, which can enhance the sense of integration of the image display device. The phrase "smooth surface of the bezel (frame)" means that the surface of the bezel (frame) has an all-purpose mirror finish.

It is also preferable that the image display device of the present invention is a foldable type image display device or a rollable type image display device. In this case, the anti-glare film preferably has the above-described bending resistance.

EXAMPLES

Hereinafter, the present invention will be described in more detail using examples, but the present invention is by no means limited by the examples. Unless otherwise particularly described, "parts" and "%" are mass-based.

1. Measurement and Assessment

The anti-glare films of the Examples and Comparative Examples were measured and assessed as described below. The atmosphere at the time of each measurement and assessment was a temperature of 23±5° C. and a humidity of 40 to 65%. In addition, before the start of each measurement and assessment, the target sample was exposed to the above-described atmosphere for 30 minutes or more, and then the measurement and assessment were performed. The results are shown in Tables 1 and 2.

1-1. Measurement of Surface Shape

The anti-glare films of the Examples and Comparative Examples were cut into 10 cm squares. The cut locations were selected from random sites after visually confirming that there were no abnormalities such as dust or scratches. A sample was produced by attaching a black plate (manufactured by Kuraray, trade name: Comoglas, product number: DFA502K, thickness 2.0 mm) having a size of 10 cm in length and 10 cm in width to the second main surface side of the cut anti-glare film via an optical transparent adhesive sheet (trade name: Panaclean PD-S1) manufactured by Panac.

Using a surface roughness measuring instrument (model number: SE-3400/manufactured by Kosaka Laboratory Ltd.), the sample was set so as to be fixed to and in close contact with the measurement stage, and then the surface shape on the resin layer side (first main surface side) of each sample was measured in relation to the following measurement items under the following measurement conditions. Based on the description in the main text of the specification, the measurement was performed at sixteen locations for each sample, and the average value of fourteen locations excluding the minimum value and the maximum value was taken as the $\theta a_{2.5}$, $\theta a_{0.8}$, $S_{2.5}$, $S_{0.8}$, $Ra_{2.5}$, $Ra_{0.8}$, and $Rz_{0.8}$ of each Example and Comparative Example.

<Measurement Conditions>

[Stylus of Surface Roughness Detector]

Trade name SE2555N manufactured by Kosaka Laboratory Ltd. (tip radius of curvature: 2 μm, apex angle: 90 degrees, material: diamond)

[Measurement Conditions of Surface Roughness Measuring Instrument]

JIS mode: JIS1994
Application speed of stylus: 0.5 mm/s
Vertical magnification: 50,000 times
Horizontal magnification: 5 times
Skid: Used (contact with the measurement surface)
Cut-off filter type: Gaussian
Dynamic range: Wide
Overscale: Error mode
Dead zone level: 10%
Tp/PC curve: Normal
Sampling mode: c=1500
Operation mode: Normal
Leveling: All data
Assessment length: 5 times the cutoff
Spare length: 0.5 times the cutoff
Detector: PUDJ2US (height when lever is horizontal 7.85 mm, length 30 mm)

<Measurement Items>

Average inclination angle $\theta a_{2.5}$ at a cut-off value of 2.5 mm

Average inclination angle $\theta a_{0.8}$ at a cut-off value of 0.8 mm

Average local peak-to-peak interval $S_{2.5}$ at a cut-off value of 2.5 mm of JIS B0601: 1994

Average local peak-to-peak interval $S_{0.8}$ at a cut-off value of 0.8 mm of JIS B0601: 1994

Arithmetic average roughness $Ra_{2.5}$ at a cut-off value of 2.5 mm of JIS B0601: 1994

Arithmetic average roughness $Ra_{0.8}$ at a cut-off value of 0.8 mm of JIS B0601: 1994

Ten-point average roughness $Rz_{0.8}$ at a cut-off value of 0.8 mm of JIS B0601: 1994

1-2. Specular Glossiness

The specular glossiness (20-degrees and 60-degrees) of JIS Z8741: 1997 on the resin layer side (first main surface side) of the sample produced in 1-1 was measured by a gloss meter (manufactured by Murakami Color Research Laboratory, trade name GM-26PRO). The sample was measured after turning on the power switch of the device in advance so that the light source became stable, and then waiting for 15 minutes or more and performing standard adjustment using the standard plate provided with the device. For standard adjustment, the standard plate was set on the sample table so that the black glass surface of the standard plate was the measurement surface, and a span adjustment knob was used to adjust the value to the value specified for the standard plate. In addition, based on the description in the main text of the specification, the measurement was performed at sixteen locations for each sample, and the average value of fourteen locations excluding the minimum value and the maximum value was taken as the 20-degree specular glossiness ($G_{20}$) and the 60-degree specular glossiness ($G_{60}$) of each Example and Comparative Example.

1-3. Total Light Transmittance

The anti-glare films of the Examples and Comparative Examples were cut into 10 cm squares. The cut locations were selected from random sites after visually confirming that there were no abnormalities such as dust or scratches. Using a haze meter (HM-150, manufactured by Murakami Color Research Laboratory), the total light transmittance of JIS K7361-1: 1997 of each sample was measured. The measurement was carried out after turning on the power switch of the device in advance so that the light source became stable, then waiting for 15 minutes or more, performing calibration without setting anything in the opening (where the measurement sample is placed), and then setting the measurement sample in the opening. In addition, based on the description in the main text of the specification, the measurement was performed at sixteen locations for each sample, and the average value of fourteen locations excluding the minimum value and the maximum value was taken as the total light transmittance of each Example and Comparative Example. The transparent substrate side was used as the light incident surface, and the measurement sample was placed so as to avoid fingerprints and wrinkles.

1-4. Graininess

The anti-glare films of the Examples and Comparative Examples were cut to a width of 884 mm and a length of 498 mm (diagonal 1015 mm). The cut locations were selected from random sites after visually confirming that there were no abnormalities such as dust or scratches. A sample was produced by attaching the second main surface side of the cut anti-glare film to a black plate (manufactured by Kuraray, trade name: Comoglas, product number: DFA502K, thickness 2.0 mm) having the same size as the anti-glare film via an optical transparent adhesive sheet (trade name: Panaclean PD-S1) manufactured by Panac. The sample was produced using a roller having a width of 600 mm while being careful not to allow air bubbles to enter. The sample can be regarded as a state equivalent to the case where the power of the image display device is OFF.

The sample is placed on a horizontal table with the first main surface facing up. In a bright room environment (the illuminance on the first main surface of the sample was 500 to 1000 lux; illumination: Hf32 straight tube three-wavelength natural white fluorescent lamp; the position of the illumination was 2 m above the horizontal table in the vertical direction), and the graininess was visually assessed from all angles where the reflected light of the illumination (fluorescent lamp) was observed. The assessment was performed from a position at a straight-line distance of 50 cm from the center of the first main surface of the sample.

With the following (1) and (2) as the assessment matters, the assessment was carried out on twenty test subjects (five test subjects in each age group in their 20s to 50s), in which three points were given when both of the following (1) and (2) were satisfied, two points were given when only one of the following (1) and (2) was satisfied, and one point was given when neither of the following (1) and (2) were satisfied. The average score of the assessment of the twenty test subjects was calculated and ranked according to the following criteria.

<Assessment Matters>
(1) When the center of the reflection region of illumination (fluorescent lamp) was gazed at, the graininess (fine foreign body feeling) of the region was weak, and the appearance was extremely fine.
(2) When a peripheral region away from the center of the reflection region of illumination (fluorescent lamp) was gazed at, the graininess (unevenness feeling) of the region was weak and the appearance was very fine.

<Assessment Criteria>
AA: Average score of 2.7 or higher
A: Average score of 2.5 or higher and lower than 2.7
B: Average score of 2.2 or higher and lower than 2.5
B: Average score of 2.0 or higher and lower than 2.2
C: Average score of 1.5 or higher and lower than 2.0
D: Average score of lower than 1.5

1-5. Anti-Glare Properties

The sample prepared in 1-1 was placed on a horizontal table so that the first main surface faced up. Under a bright room environment (a bright room environment equivalent to the graininess assessment of 1-4), the samples were assessed based on the following criteria as to whether or not anti-glare properties were obtained to the extent that the observer's own reflection was not noticeable for twenty test subjects (five test subjects in each age group in their 20s to 50s) visually observing from 50 cm directly above the center of the first main surface of the sample.

A: fourteen people or more answered "good"
B: seven to thirteen people answered "good"
C: six people or less answered "good"

1-6. Scintillation

The anti-glare films of the Examples and Comparative Examples were cut into 10 cm squares. The cut locations were selected from random sites after visually confirming that there were no abnormalities such as dust or scratches. Next, a 4K-resolution liquid crystal display device with a diagonal of 800 mm (width 697 mm×length 392 mm) was arranged on a horizontal table, and the second main surface side of the anti-glare film was attached to the liquid crystal display surface via an optical transparent adhesive sheet (trade name: Panaclean PD-S1) manufactured by Panac. In that state, with the screen of the liquid crystal display device displayed in green, a visual assessment was carried out as to whether scintillation (subtle luminance unevenness of the image light) was noticeable at the location where the anti-glare film was attached was observed from all angles 50 cm directly above the anti-glare film.

The samples were assessed by twenty test subjects (five test subjects in each age group in their 20s to 50s), in which three points were given when scintillation was felt, two points were given when they were unsure whether or not scintillation was felt, and one point was given when scintillation was strongly felt. The average score of the assessment of the twenty test subjects was calculated and ranked according to the following criteria.

<Assessment Criteria>
A: Average score of 2.5 or higher
B: Average score of 2.0 or higher and lower than 2.5
C: Average score of 1.5 or higher and lower than 2.0
D: Average score of lower than 1.5

2. Production of Anti-Glare Film

Example 1

A surface shape satisfying the above Equations (1) to (4) was designed by simulation, and a male mold was produced by reproducing the designed surface shape on a stainless-steel plate by laser microfabrication. The surface shape of the male mold was substantially the same as the surface shape of the resin layer (first main surface) of Example 1 in Table 1. Next, a forming mold (female mold) was produced by inverting the uneven shape of the male mold by electroforming. Next, an ionizing radiation radiation-curable resin composition (a composition composed of 50 parts of an acrylic monomer (methyl methacrylate manufactured by Wako Pure Chemical Industries, Ltd.), 45 parts of a polyfunctional acrylic monomer (trade name "NK ester A-TMPT-3E0" manufactured by Shin-Nakamura Chemical Co., Ltd.), and 5 parts of a photopolymerization initiator (trade name "Omnirad 184" manufactured by IGM Resins By)) was poured into the female mold, and a polyester film with a thickness of 100 μm (trade name Cosmo Shine A4300, manufactured by Toyobo Co., Ltd.) was adhered thereon. In this state, ultraviolet rays were irradiated from the polyester film side to cure the ionizing radiation radiation-curable resin composition. Then, the polyester film and the resin were peeled from the mold to obtain the anti-glare film of Example 1 having the resin layer on the transparent substrate. The thickness of the resin layer was 4.0 μm. The surface of the anti-glare film on the resin layer side was the first main surface.

Examples 2 to 4 and Comparative Examples 1 to 3

The anti-glare films of Examples 2 to 4 and Comparative Examples 1 to 3 were obtained in the same manner as in Example 1, except that the surface shape to be simulated was changed. The surface shapes of the male molds of Examples 2 to 4 and Comparative Examples 1 to 3 were substantially the same as the surface shapes of the resin layers (first main surface) of Examples 2 to 4 and Comparative Examples 1 to 3 in Table 1.

Example 5

A resin layer coating liquid 1 having the following formulation was coated on a transparent substrate (PET film with a thickness of 100 μm, product name "Cosmo Shine (registered trademark) A4300", in-plane phase difference (Re): 3200 nm, manufactured by Toyobo Co., Ltd.). Then, after drying at 70° C. and a wind speed of 5 m/s for 30 seconds, a resin layer was formed by irradiating with ultraviolet rays under a nitrogen atmosphere (oxygen concentration of 200 ppm or less) so that the integrated light amount was 100 mJ/cm$^2$ to obtain the anti-glare film of Example 5. The film thickness of the resin layer was 3.0 μm. In the anti-glare film of Example 5, the surface on the resin layer side was the first main surface.

<Resin Layer Coating Liquid 1>
- 20 parts of urethane acrylate oligomer (KRM7804, 9-functional, weight average molecular weight 3000, manufactured by Daicel-Cytec)
- 25 parts of isocyanuric acid EO-modified triacrylate (M-313 manufactured by Toagosei Co., Ltd.)
- 10 parts of 2-hydroxy-3-acryloyloxypropyl methacrylate monomer (trade name: NK ester 701A, manufactured by Shin-Nakamura Chemical Co., Ltd., bifunctional)
- 6 parts of photopolymerization initiator
- 0.08 parts of silicone leveling agent (TSF4460, manufactured by Momentive Performance Materials)
- 0.05 parts by mass of fluorine-based leveling agent (trade name "Megaface F-568" manufactured by DIC Corporation)
- 5 parts of transmissive particles (manufactured by Sekisui Kasei Co., Ltd., spherical polyacrylic-styrene copolymer) (average particle size 2.0 μm, refractive index 1.515) (the proportion of particles with a particle size of 1.8 to 2.2 μm was 90% or more)
- 155 parts of inorganic fine particle dispersion liquid (manufactured by Nissan Chemical Corporation, silica with reactive functional group introduced on the surface, solvent MIBK, solid content 35%) (average particle size 12 nm)
- 5 parts by mass of ultraviolet absorber A (benzotriazole-based ultraviolet absorber) (trade name: JF-79, manufactured by Johoku Chemical Co., Ltd.) (maximum absorption wavelength: 355 nm)
- ultraviolet absorber 5 parts by mass (triazine-based ultraviolet absorber) (trade name: Tinuvin 479, manufactured by BASF) (maximum absorption wavelength: 322 nm)
- 75 parts of solvent 1 (toluene)
- 50 parts of solvent 2 (propylene glycol monomethyl ether acetate)

TABLE 1

| | Surface Shape | | | | | | | | | | |
|---|---|---|---|---|---|---|---|---|---|---|---|
| | $\theta a_{2.5}$ (degrees) | $\theta a_{0.8}$ (degrees) | $\|\theta a_{2.5} - \theta a_{0.8}\|$ (degrees) | $Ra_{2.5}$ (μm) | $Ra_{0.8}$ (μm) | $Ra_{2.5}/Ra_{0.8}$ | $S_{2.5}$ ([[μm]] mm) | $S_{0.8}$ ([[μm]] mm) | $S_{2.5}/S_{0.8}$ | $Rz_{0.8}$ (μm) | $Rz_{0.8}/Ra_{0.8}$ |
| Example 1 | 0.234 | 0.262 | 0.029 | 0.060 | 0.059 | 1.03 | 0.066 | 0.053 | 1.23 | 0.215 | 3.67 |
| Example 2 | 0.330 | 0.370 | 0.040 | 0.088 | 0.079 | 1.11 | 0.077 | 0.069 | 1.12 | 0.325 | 4.10 |
| Example 3 | 0.292 | 0.355 | 0.063 | 0.076 | 0.070 | 1.08 | 0.090 | 0.069 | 1.32 | 0.306 | 4.34 |
| Example 4 | 0.373 | 0.444 | 0.072 | 0.074 | 0.066 | 1.12 | 0.056 | 0.047 | 1.20 | 0.312 | 4.74 |
| Example 5 | 0.539 | 0.624 | 0.085 | 0.092 | 0.079 | 1.16 | 0.085 | 0.063 | 1.35 | 0.343 | 4.34 |
| Comparative Example 1 | 0.695 | 0.727 | 0.032 | 0.136 | 0.113 | 1.20 | 0.058 | 0.050 | 1.15 | 0.538 | 4.75 |
| Comparative Example 2 | 0.363 | 0.481 | 0.118 | 0.070 | 0.060 | 1.17 | 0.063 | 0.040 | 1.56 | 0.301 | 5.05 |
| Comparative Example 3 | 1.128 | 1.251 | 0.123 | 0.311 | 0.306 | 1.02 | 0.124 | 0.102 | 1.21 | 1.381 | 4.51 |

TABLE 2

| | \multicolumn{4}{c}{Optical Properties} | \multicolumn{3}{c}{Assessment} |
| | $G_{20}$ | $G_{60}$ | $G_{60}/G_{20}$ | Total Light Transmittance (%) | Graininess | Anti-Glare | Scintillation |
|---|---|---|---|---|---|---|---|
| Example 1 | 23.5 | 52.6 | 2.24 | 94.9 | A | A | A |
| Example 2 | 61.4 | 90.4 | 1.47 | 92.0 | B | A | B |
| Example 3 | 65.7 | 89.0 | 1.35 | 91.9 | B | A | A |
| Example 4 | 57.5 | 86.1 | 1.50 | 91.8 | B | A | A |
| Example 5 | 51.2 | 83.6 | 1.63 | 91.8 | B- | A | B |
| Comparative Example 1 | 33.6 | 74.9 | 2.23 | 91.5 | C | A | C |
| Comparative Example 2 | 62.6 | 87.7 | 1.40 | 91.9 | C | A | A |
| Comparative Example 3 | 22.1 | 65.2 | 2.95 | 91.7 | D | A | D |

From the results in Tables 1 and 2, it can be confirmed that the anti-glare film of the Examples can suppress reflection and impart a sense of luxury by suppressing surface graininess. Specifically, the anti-glare film of the Examples had good anti-glare properties because $\theta a_{0.8}$ was 0.20 degrees or higher. Further, in the anti-glare film of the Examples, $\theta a_{0.8}$ was 0.70 degrees or lower and $|\theta a_{2.5} - \theta a_{0.8}|$ was 0.10 degrees or lower, so that the first main surface could have short-cycle unevenness while having a shape with a small ratio of ultralow-frequency unevenness. Further, it can be confirmed that the anti-glare film of the Examples having such a first main surface can suppress graininess and impart a sense of luxury. On the other hand, the anti-glare films of Comparative Examples 1 to 3 had good anti-glare properties because $\theta a_{0.8}$ was 0.20 degrees or higher, since $\theta a_{0.8}$ exceeded 0.70 degrees and/or $|\theta a_{2.5} - \theta a_{0.8}|$ was higher than 0.10 degrees, graininess could not be suppressed.

3. Consecutive Folding Test

The anti-glare film of Example 5 was prepared as a Sample 1. Further, anti-glare films produced in the same manner as in Example 5, except that the substrate of Example 5 was changed to the following substrates, were prepared as Samples 2 to 9.

Sample 2: A PET film with a thickness of 38 μm (trade name "Cosmo Shine (registered trademark) A4300", in-plane phase difference (Re): 1140 nm, Nz coefficient 3.4, manufactured by Toyobo Co., Ltd.)

Sample 3: A PET film with a thickness of 38 μm (in-plane phase difference (Re): 600 nm, Nz coefficient 23) (the method of producing Sample 3 will be described later)

Sample 4: A COP film with a thickness of 60 μm (Zeonor Film (registered trademark) ZD14, manufactured by Zeon Corporation)

Sample 5: A COP film with a thickness of 20 μm (Zeonor Film (registered trademark) ZT12, manufactured by Zeon Corporation)

Sample 6: A TAC film with a thickness of 60 μm (Fujitack TD60UL, manufactured by Fujifilm)

Sample 7: A TAC film with a thickness of 25 μm (Fujitack TJ25UL, manufactured by Fujifilm)

Sample 8: An acrylic film with a thickness of 40 μm (OXIS (registered trademark)-ZU, in-plane phase difference 1.5 nm, manufactured by Okura Industrial Co., Ltd.)

Sample 9: An acrylic film with a thickness of 30 μm (OXIS (registered trademark)-ZU, in-plane phase difference 1.3 nm, manufactured by Okura Industrial Co., Ltd.)

<Preparation of PET Film of Sample 3>

First, 1 kg of PET (melting point 258° C., absorption center wavelength: 320 nm) and 0.1 kg of an ultraviolet absorber (2,2'-(1,4-phenylene)bis(4H-3,1-benzoxadinone-4)-one) was melted and mixed at 280° C. in a kneader to produce pellets containing an ultraviolet absorber. The pellets and PET having a melting point of 258° C. were charged into a single-shaft extruder, melt-kneaded at 280° C., extruded from a T-die, and cast on a cast drum whose surface temperature was controlled to 25° C. to obtain a casting film. The amount of ultraviolet absorber in the casting film was 1 part by mass with respect to 100 parts by mass of PET.

The obtained casting film was heated by a roll group set at 95° C., and then, while heating by a radiation heater so that a turbulent flow was generated from both sides of the film so that the film temperature at a 150 mm point of a 400 mm stretching section (starting point is stretching roll A, ending point is stretching roll B, and stretching rolls A and B each have two nip rolls) was 103° C., stretched by a factor of 3.6 in the flow direction and then cooled.

Next, both sides of this uniaxially stretched film were subjected to a corona discharge treatment in air to set the wet tension of the substrate film to 55 mN/m. Then, an easy-to-slip layer coating liquid including a polyester resin having a glass transition temperature of 18° C., a polyester resin having a glass transition temperature of 82° C., and silica particles having an average particle size of 100 nm was in-line coated on the corona discharge treated surfaces on both sides of the film to form an easy-to-slip layer.

Next, the uniaxially stretched film was guided to a tenter, preheated with 95° C. hot air, and then stretched by a factor of 3.8 in the film width direction at a temperature of 105° C. for the first step and 140° C. for the second step. Here, the stretching was carried out in two steps as mentioned above so that when the horizontally stretched section is divided into two, the stretched amount of the film at the midpoint of the horizontally stretched section (film width minus film width before stretching at the measurement point) is 80% of the stretched amount at the end of the horizontally stretched section. The horizontally stretched film was heat-treated in hot air in steps in a tenter from 180° C. to a heat treatment temperature of 240° C., then subjected to a 1% relaxation treatment in the width direction under the same temperature conditions after having been quenched to 100° C., and then wound to obtain a biaxially stretched PET film (thickness 38 μm).

For Samples 1 to 9, the consecutive folding test described in the main text of the specification was carried out, and flexibility, creases, and microcracks were assessed according to the following criteria. The assessment method for creases and microcracks was as described in the main text of the specification.

The folding conditions (interval (I), number of folds) were the three patterns shown in Table 3. Other test conditions were a reciprocating speed of 80 rpm (folds per minute), a test stroke of 60 mm, and a bending angle of 180 degrees. Further, the samples were folded so that the resin layer was on the inside.

(1) Flexibility

The bent portion of the anti-glare film after the consecutive folding test was visually observed, and the flexibility was assessed according to the following criteria. When the region of each anti-glare film to become the bent portion was observed before the folding test, no cracks or fractures were observed. The assessment criteria were as follows.

A: Even after the folding test, no cracks or fractures occurred in the bent portion.
B: After the folding test, some cracks were formed at the bent portion, but not at a level that would be a problem in actual use.
C: After the folding test, the bent portion was cracked or fractured.

(2) Creases After the Folding Test

The bent portion of the anti-glare film after the consecutive folding test was visually observed, and the creases were assessed according to the following criteria.

A: No creases were observed.
B: A few creases were observed, but not at a level that would be problem in actual use.
C: Creases were clearly observed on the anti-glare film.

(3) Microcracks After the Folding Test

The bent portion of the anti-glare film after the consecutive folding test was observed with a digital microscope, and microcracks were assessed according to the following criteria.

A: No microcracks were observed.
B: Some microcracks were observed, but not at a level that would be a problem in actual use.
C: Microcracks were clearly observed.

From the results of the consecutive folding test in Table 3, a film thickness of 40 μm or less tended to be better for all resin types. For COP, a film thickness of 60 μm or less can be said to be better than other resin types. Further, for PET, it was better to control the Re and Nz coefficients.

REFERENCE SIGNS LIST

A1: first main surface
A2: second main surface
10: transparent substrate
20: resin layer
100: anti-glare film
110: display element
120: image display device

The invention claimed is:

1. An anti-glare film comprising:
a first main surface; and
a second main surface opposite to the first main surface,
wherein when a property of average inclination angle with a cut-off value of 0.8 mm of the first main surface is defined as $\theta a_{0.8}$ and the average inclination angle with a cut-off value of 2.5 mm of the first main surface is defined as $\theta a_{2.5}$, the anti-glare film satisfies the following Equations (1) and (2):

$$0.20 \text{ degrees} \leq \theta a_{0.8} \leq 0.70 \text{ degrees} \tag{1}$$

$$|\theta a_{2.5} - \theta a_{0.8}| \leq 0.10 \text{ degrees} \tag{2}.$$

2. The anti-glare film according to claim 1, wherein when the average local peak-to-peak interval at a cut-off value of 0.8 mm of JIS B0601: 1994 on the first main surface is defined as $S_{0.8}$ and a property of average local peak-to-peak interval at a cut-off value of 2.5 mm of JIS B0601: 1994 on the first main surface is defined as $S_{2.5}$, the anti-glare film satisfies the following Equation (3):

$$1.05 \leq S_{2.5}/S_{0.8} \leq 1.40 \tag{3}.$$

TABLE 3

| | Gap φ: 7 mm Folding number: 100,000 times | | | Gap φ: 7 mm Folding number: 100,000 times | | | Gap φ: 4 mm Folding number: 200,000 times | | |
|---|---|---|---|---|---|---|---|---|---|
| | Flexibility | Creases | Microcracks | Flexibility | Creases | Microcracks | Flexibility | Creases | Microcracks |
| Sample 1: 100 μmPET | B | B | B | B | B | B | B | C | C |
| Sample 2: 38 μmPET, Re1140 nm | A | B | A | A | C | B | B | C | C |
| Sample 3: 38 μmPET, Re600 nm | A | A | A | A | B | B | A | B | B |
| Sample 4: 60 μmCOP | A | A | A | A | A | A | A | B | A |
| Sample 5: 20 μmCOP | A | A | A | A | A | A | A | A | A |
| Sample 6: 60 μmTAC | A | B | A | A | B | B | A | C | C |
| Sample 7: 25 μmTAC | A | A | A | A | B | A | A | B | B |
| Sample 8: 40 μm Acrylic | A | B | A | B | B | B | B | C | C |
| Sample 9: 30 μm Acrylic | A | A | A | B | B | B | B | C | B |

3. The anti-glare film according to claim 1, wherein when a property of arithmetic average roughness at a cut-off value of 0.8 mm of JIS B0601: 1994 on the first main surface is defined as $Ra_{0.8}$ and the arithmetic average roughness at a cut-off value of 2.5 mm of JIS B0601: 1994 on the first main surface is defined as $Ra_{2.5}$, the anti-glare film satisfies the following Equation (4):

$$1.03 \leq Ra_{2.5}/Ra_{0.8} \leq 1.20 \quad (4).$$

4. The anti-glare film according to claim 1, wherein when a property of 20-degree specular glossiness and a property of 60-degree specular glossiness measured from the first main surface side in accordance with JIS Z8741: 1997 are defined as $G_{20}$ and $G_{60}$, respectively, the anti-glare film satisfies the following Equation (5):

$$1.10 \leq G_{60}/G_{20} \leq 2.50 \quad (5).$$

5. The anti-glare film according to claim 1, comprising a resin layer on a transparent substrate, wherein the surface of the resin layer serves as the first main surface.

6. The anti-glare film according to claim 5, wherein the transparent substrate has a thickness of 5 to 300 μm.

7. The anti-glare film according to claim 1, wherein a total thickness is 7 to 310 μm.

8. A polarization plate comprising:
a polarizer;
a transparent protection plate A arranged on one side of the polarizer; and
a transparent protection plate B arranged on the other side of the polarizer,
wherein at least one selected from the group consisting of the transparent protection plate A and the transparent protection plate B is the anti-glare film according to claim 1, and the anti-glare film is arranged so that the surface on the first main surface side faces the side opposite to the polarizer.

9. A surface plate for an image display device, comprising an anti-glare film attached to a resin plate or a glass plate, wherein the anti-glare film is the anti-glare film according to claim 1, and the anti-glare film is arranged so that the surface on the first main surface side faces the side opposite to the resin plate or the glass plate.

10. An image display device comprising the anti-glare film according to claim 1 arranged on a display element such that the surface on the first main surface side of the anti-glare film faces the side opposite to the display element, and the anti-glare film is arranged on the outermost surface.

* * * * *